United States Patent
Rosenberg et al.

(10) Patent No.: US 11,592,935 B2
(45) Date of Patent: Feb. 28, 2023

(54) SYSTEM AND METHOD FOR DETECTING AND CHARACTERIZING TOUCH INPUTS AT A HUMAN-COMPUTER INTERFACE

(71) Applicant: Sensel, Inc., Sunnyvale, CA (US)

(72) Inventors: Ilya Daniel Rosenberg, Sunnyvale, CA (US); Ninad Sathe, Sunnyvale, CA (US); Eric Rosales, Sunnyvale, CA (US)

(73) Assignee: Sensel, Inc., Sunnyvale, CA (US)

( * ) Notice: Subject to any disclaimer, the term of this patent is extended or adjusted under 35 U.S.C. 154(b) by 0 days.

(21) Appl. No.: 17/669,209

(22) Filed: Feb. 10, 2022

(65) Prior Publication Data

US 2022/0164102 A1 May 26, 2022

Related U.S. Application Data

(63) Continuation of application No. 17/191,636, filed on Mar. 3, 2021, now Pat. No. 11,281,330.
(Continued)

(51) Int. Cl.
*G06F 3/041* (2006.01)
*G06F 3/045* (2006.01)
(Continued)

(52) U.S. Cl.
CPC ........ *G06F 3/041661* (2019.05); *G06F 3/045* (2013.01); *G06F 3/046* (2013.01);
(Continued)

(58) Field of Classification Search
CPC ......... G06F 3/041661; G06F 3/041662; G06F 3/045; G06F 3/046; G06F 3/0445;
(Continued)

(56) References Cited

U.S. PATENT DOCUMENTS 7,663,607 B2 2/2010 Hotelling et al.
10,459,542 B1 * 10/2019 Costante ................. G06F 1/169
(Continued)

OTHER PUBLICATIONS

International Search Report received in PCT/US21/20753 dated Jul. 27, 2021.

*Primary Examiner* — Ibrahim A Khan
(74) *Attorney, Agent, or Firm* — Run8 Patent Group, LLC; Peter Miller; Alexander Rodriguez

(57) ABSTRACT

One variation of a system for detecting inputs at a computing device includes: a substrate including a top layer, a bottom layer defining an array of support locations, and electrode pairs proximal the support locations; a touch sensor surface arranged over the top layer of the substrate; a set of spacers, each arranged over an electrode pair at a support location on the bottom layer of the substrate and including a force-sensitive material exhibiting variations in local bulk resistance responsive to variations in applied force; an array of spring elements coupled to the set of spacers, configured to support the substrate on a chassis, and configured to yield to displacement of the substrate downward toward the chassis responsive to forces applied to the touch sensor surface; and a controller configured to interpret forces of inputs on the touch sensor surface based on resistance values of the electrode pairs.

20 Claims, 12 Drawing Sheets

Related U.S. Application Data

(60) Provisional application No. 63/063,168, filed on Aug. 7, 2020, provisional application No. 63/040,433, filed on Jun. 17, 2020, provisional application No. 62/984,448, filed on Mar. 3, 2020.

(51) Int. Cl.
*G06F 3/046* (2006.01)
*G06F 3/044* (2006.01)

(52) U.S. Cl.
CPC ........ *G06F 3/0445* (2019.05); *G06F 3/04144* (2019.05); *G06F 3/041662* (2019.05); *G06F 2203/04104* (2013.01); *G06F 2203/04105* (2013.01)

(58) Field of Classification Search
CPC ....... G06F 3/04144; G06F 2203/04105; G06F 2203/04104
See application file for complete search history.

(56) References Cited

U.S. PATENT DOCUMENTS

| | | | |
|---|---|---|---|
| 2009/0091548 A1* | 4/2009 | Fujii | G06F 3/045 345/173 |
| 2010/0253633 A1* | 10/2010 | Nakayama | G06F 3/03547 345/169 |
| 2011/0025631 A1* | 2/2011 | Han | G06F 3/0445 345/173 |
| 2012/0050207 A1 | 3/2012 | Westhues et al. | |
| 2012/0068938 A1* | 3/2012 | Kontio | G06F 3/03547 345/173 |
| 2012/0068971 A1* | 3/2012 | Pemberton-Pigott | G06F 3/0416 345/175 |
| 2012/0188194 A1* | 7/2012 | Sulem | G06F 1/1643 345/174 |
| 2012/0293450 A1* | 11/2012 | Dietz | G06F 3/04144 178/18.05 |
| 2013/0106718 A1 | 5/2013 | Sundara-Rajan | |
| 2013/0187742 A1* | 7/2013 | Porter | G06F 3/046 336/200 |
| 2013/0264179 A1* | 10/2013 | Ryonai | G06F 3/041 200/269 |
| 2014/0002113 A1* | 1/2014 | Schediwy | G06F 3/0446 324/661 |
| 2014/0347311 A1 | 11/2014 | Joharapurkar et al. | |
| 2017/0285848 A1* | 10/2017 | Rosenberg | G06F 3/04883 |
| 2017/0336904 A1* | 11/2017 | Hsieh | G06F 3/0412 |
| 2019/0212842 A1* | 7/2019 | Hinson | G01L 1/142 |
| 2019/0339776 A1* | 11/2019 | Rosenberg | G06F 3/0416 |
| 2021/0109615 A1* | 4/2021 | Hu | G06F 3/045 |

\* cited by examiner

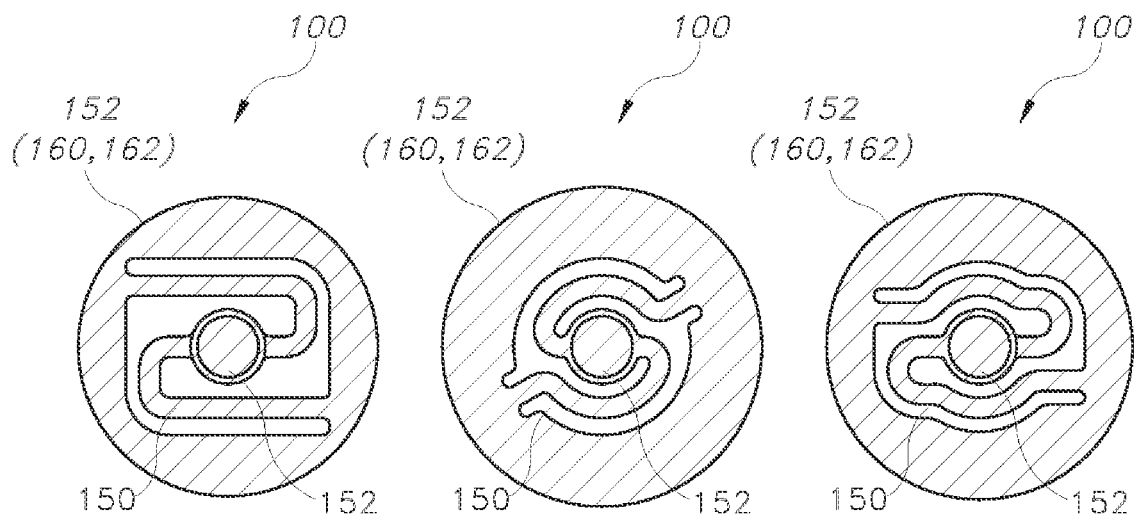
*FIG. 8A*   *FIG. 8B*   *FIG. 8C*
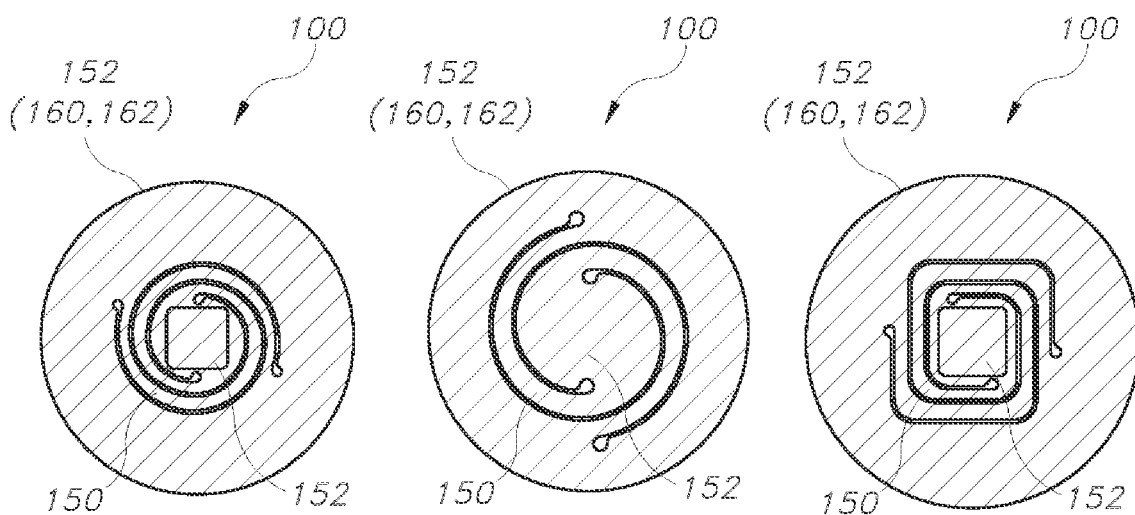
*FIG. 8D*   *FIG. 8E*   *FIG. 8F*

SYSTEM AND METHOD FOR DETECTING AND CHARACTERIZING TOUCH INPUTS AT A HUMAN-COMPUTER INTERFACE

CROSS-REFERENCE TO RELATED APPLICATIONS

This Application is a continuation of U.S. Non-Provisional patent application Ser. No. 17/191,636, filed on 3 Mar. 2021, and claims the benefit of U.S. Provisional Patent Application Nos. 62/984,448, filed on 3 Mar. 2020, 63/040,433, filed on 17 Jun. 2020, and 63/063,168, filed on 7 Aug. 2020, each of which is incorporated in its entirety by this reference.

This Application is related to U.S. patent application Ser. No. 14/499,001, filed on 26 Sep. 2014, and Ser. No. 16/297,426, filed on 8 Mar. 2019, each of which is incorporated in its entirety by this reference.

TECHNICAL FIELD

This invention relates generally to the field of touch sensors and more specifically to a new and useful human-computer interface system in the field of touch sensors.

BRIEF DESCRIPTION OF THE FIGURES

FIGS. 8A-8F are schematic representations of variations of the system;

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
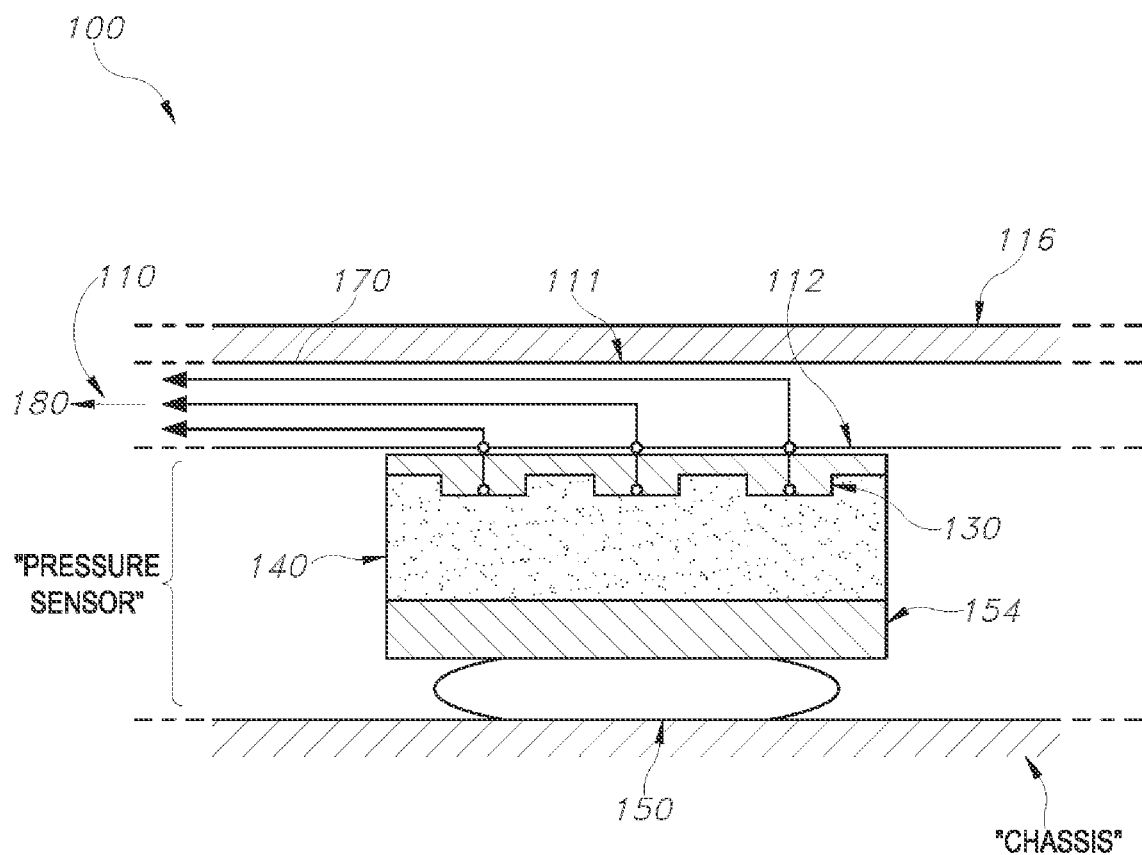
FIG. 1 is a schematic representation of a system.
Figure 2:
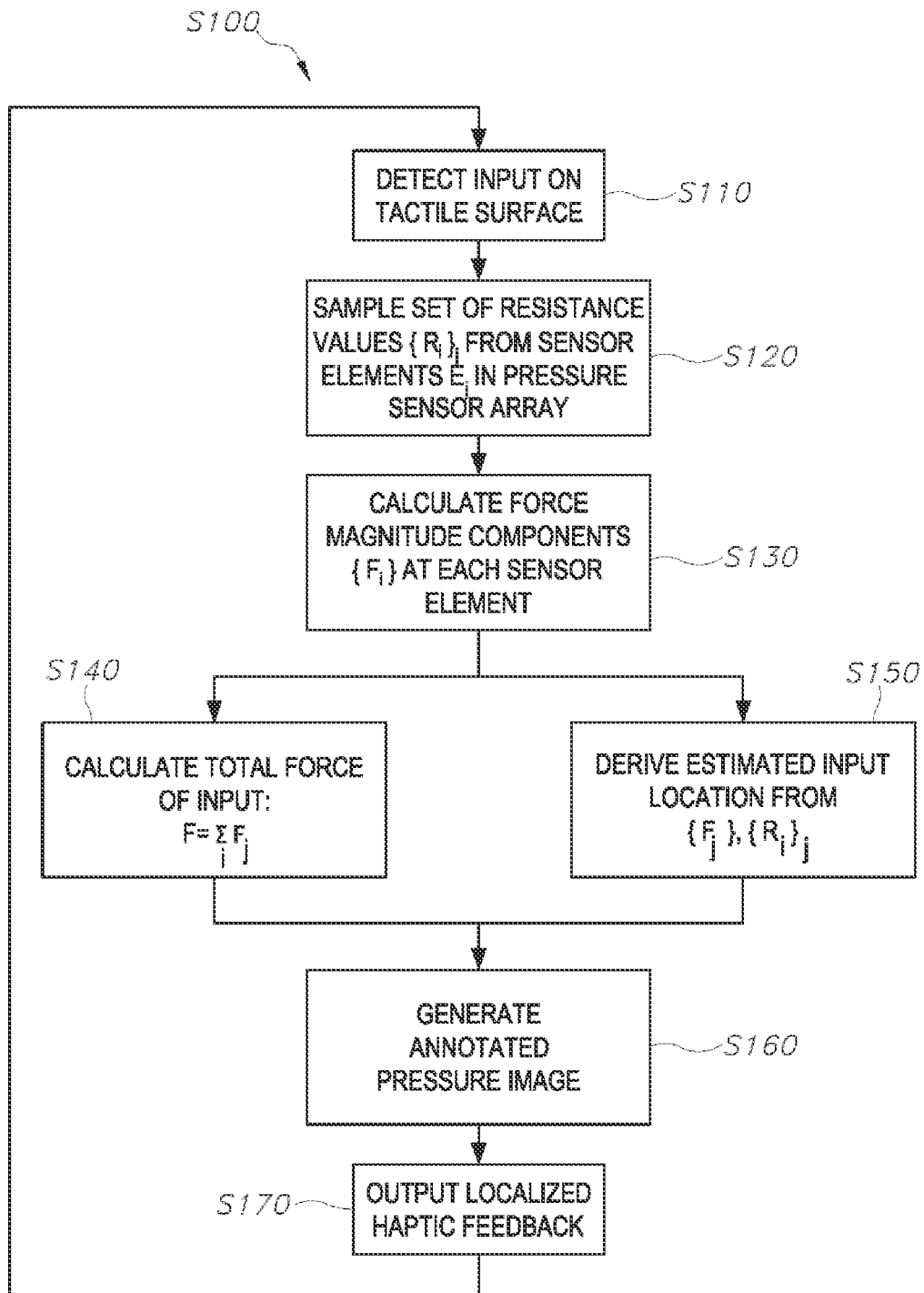
FIG. 2 is a flowchart representation of a method.

As shown in FIGS. 1 and 2, a method S100 for characterizing inputs at a surface of a computing device includes: detecting a touch input at a touch sensor surface 116 arranged above a pressure sensor including an array of pressure sensor elements at Block S110; reading a set of resistance values from drive electrode and sense electrode pairs 130 in each pressure sensor element in the array of pressure sensor elements at Block S120; transforming the set of resistance values into a set of magnitude components of a force exerted over the touch sensor surface 116 by the touch at Block S130; calculating a magnitude of the force based on the set of magnitude components at Block S140; deriving an estimated location of the touch input on the touch sensor surface 116 based on differences between magnitude components in the set of magnitude components at Block S150; generating a pressure image associated with the touch input representing a force distribution across the touch sensor surface 116 and the estimated location of the touch input at Block S160; and, in response to the magnitude of the force exceeding a threshold magnitude, selectively driving a vibrator in a set of vibrators closest to the estimated location of the touch input to oscillate the touch sensor surface 116 at Block S170.

1.1 Applications

Generally, the method S100 can be executed by a system 100 that includes a set of (lower-resolution) pressure sensor elements, a (higher-resolution) capacitive touch sensor 170, and a controller 180: to detect and distinguish locations of inputs on a touch sensor surface 116 (e.g., a trackpad, a keyboard, a touch-sensitive display) of the system 100 based on high-resolution data captured by the capacitive touch sensor 170; to interpret a force distribution across the touch sensor surface 116 based on concurrent low-resolution force data captured by the set of pressure sensor elements and locations of these pressure sensor elements; to interpret forces applied to the touch sensor surface 116 based on detected locations of these inputs and the force distribution; and to generate scan images representing locations of inputs and force magnitudes of these inputs. More specifically, the system 100 can fuse low-resolution pressure data—output by a set of discrete pressure sensor elements distributed at intermittent locations behind a touch sensor surface 116—with high-resolution input location data—output by a capacitive touch sensor 170 spanning this touch sensor surface 116—to generate a high-resolution spatial image of inputs on the touch sensor surface 116, annotated with high-resolution pressure or force information.

The system 100 can include a low-resolution pressure sensor array that includes a quantity of pressure sensor elements that is multiple orders of magnitude fewer than a quantity of pixels in the adjacent capacitive touch sensor 170 (e.g., ten pressure sensor elements versus two million capacitive touch sensor 170 pixels). The system 100 can therefore: scan and interpret pressure sensor elements in the pressure sensor array over relatively short timescales and/or with limited power consumption; while capturing higher-resolution input location data via the capacitive touch sensor 170 over longer time scales and/or with greater power consumption.

In one example, the system 100 includes an array of discrete (e.g., discontinuous) pressure sensor elements (hereinafter the "pressure sensor array") that mechanically support and locate the touch sensor surface 116 within a chassis of the system 100 (e.g., a peripheral touch input device, a smartphone display, a trackpad integrated into a laptop computer). Generally, each pressure sensor element can include: a drive electrodes and sense electrode pair 130; and a force-sensitive material that exhibits variations in local bulk resistance in response to applied forces and thus yields changes in resistances between this drive electrodes and sense electrode pair 130. The controller 180 can thus: read a resistance value from each pressure sensor element during a scan cycle; transform these resistance values into force magnitudes applied to the touch sensor surface 116 and transferred into these pressure sensor elements based on known locations of these pressure sensor elements below the touch sensor surface 116; and then transform these force magnitudes into a higher-resolution force distribution across the touch sensor surface 116 during this scan cycle, such as based on known locations of the pressure sensor elements, known dynamics of the touch sensor surface 116, and locations of forces detected by the capacitive touch sensor 170 during this scan cycle. The system 100 can therefore leverage high-resolution input location data captured by the capacitive touch sensor 170 to up-sample lower-resolution force data captured by the array of discrete pressure sensor elements and then interpolate force magnitudes of discrete inputs on the touch sensor surface 116 accordingly.

Furthermore, because the system 100 includes discrete pressure sensor elements distributed across the back side of the touch sensor surface 116—such as rather than or not only along the perimeter or corners of the touch sensor surface 116—this set of discrete pressure sensor elements can mechanically support the touch sensor surface 116 with shorter maximum unsupported spans, thereby reducing deflection of the touch sensor surface 116 under applied forces, reducing strain on the (more sensitive) capacitive touch sensor 170, maintaining a high degree of accuracy and consistency in outputs of the capacitive touch sensor 170.

Similarly, because the system 100 includes discrete pressure sensor elements configured into an array across the back side of the touch sensor surface 116, the architecture of the system 100 can be scaled to touch sensor surfaces 116 of different sizes. For example, the system 100 can be scaled to a 70 mm by 120 mm touchpad (and smaller) and to a 230 mm by 360 mm laptop display (and larger) by installing a quantity of discrete pressure sensor elements that yields a target or maximum unsupported span length across the touch sensor surface 116, thereby enabling a controller 180 in these devices to calculate force distributions across the touch sensor surface 116 with resolutions and accuracies decoupled from the sizes of these touch sensor surfaces 116.

1.2 Pressure Sensor Element

Figure 3:
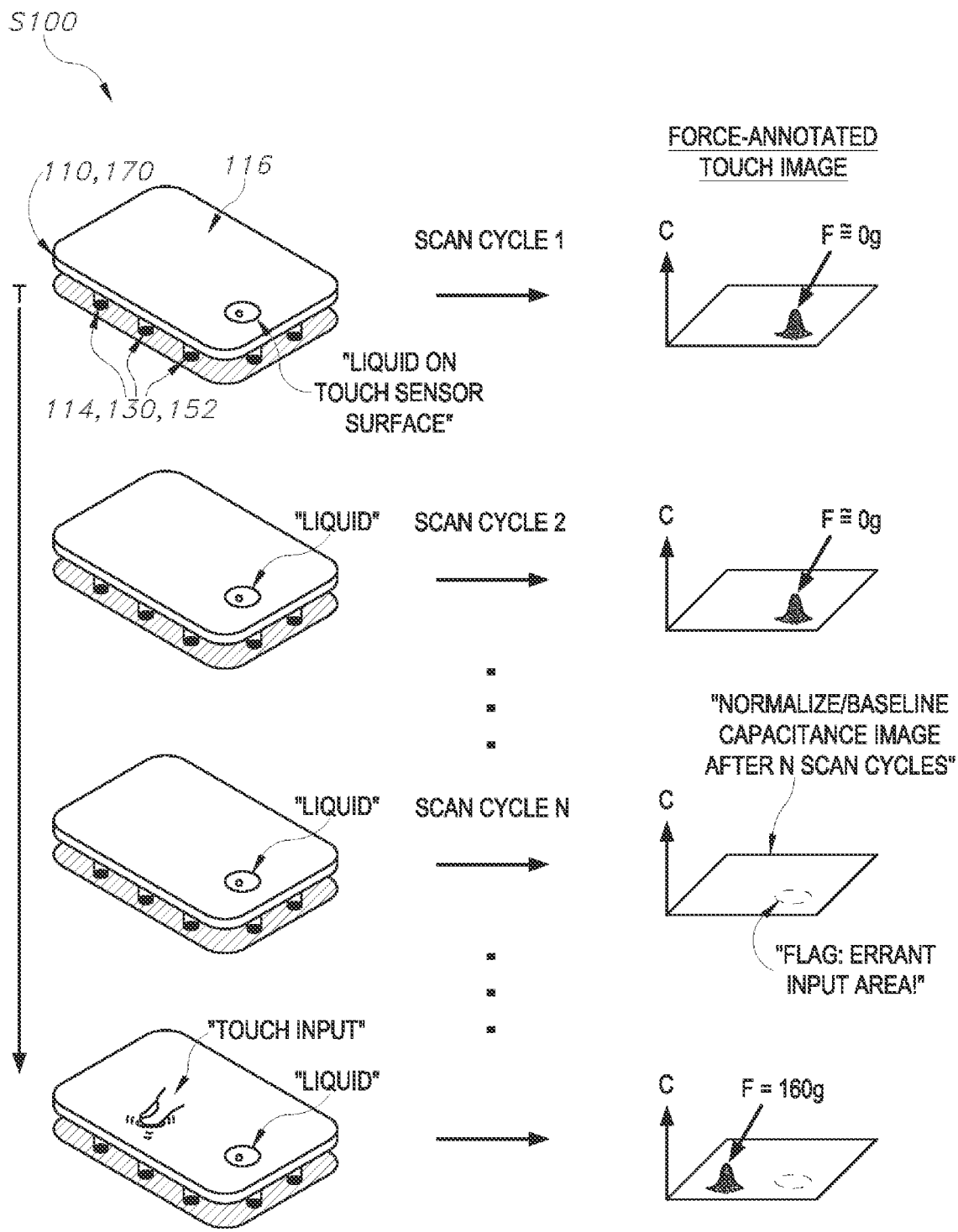
FIG. 3 is a flowchart representation of one variation of the method.
Figure 5:
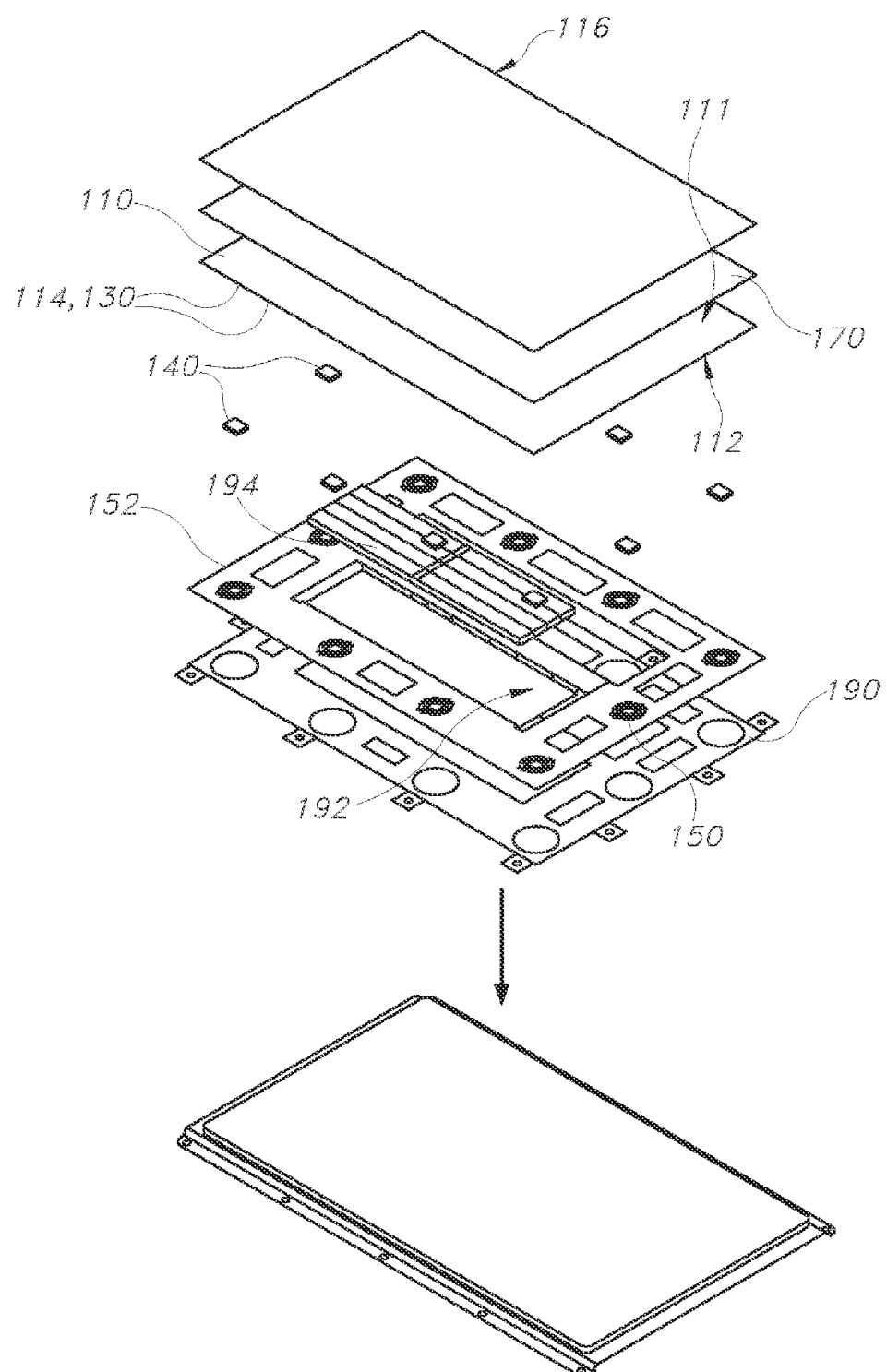
FIG. 5 is a flowchart representation of one variation of the system.

As shown in FIG. 3, the pressure sensor array includes a set of discrete pressure sensor elements. In one implementation, each pressure sensor element is formed by: a set of drive electrode and sense electrode pairs 130 formed on a substrate 110 (a fiberglass PCB); a coupon of force-sensitive material exhibiting variations in local bulk resistance (and therefore variations in local bulk conductivity) proportional to a force magnitude of an input applied to a touch sensor surface 116 of the system 100; and a spacer 140 (or a "deflection spacer") bonded to the force-sensitive material and a rigid chassis, as shown in FIG. 1, or to a spring element 150, as shown in FIG. 5.

Generally, each pressure sensor element defines a discrete resistive pressure sensor (e.g., 5-10 mm in diameter) localized to a discrete force-sensitive region on the underside of the substrate 110 and interposed between the substrate 110 and the chassis. In one implementation, each pressure sensor element includes a single drive electrode and sense electrode pair 130. For example, as described in U.S. patent application Ser. No. 14/499,001, a drive electrodes and sense electrode pair 130 can define an interdigitated electrode pair 130 extending across a support region on the bottom layer 112 of the substrate 110. Prior to assembly of the pressure sensor array, each drive electrode and sense electrode pair 130 can be surface-plated with a thin layer of gold or other inert metal (e.g., an electroless nickel immersion gold surface plating) in order to prevent oxidation of the electrodes during operation, thereby maintaining consistent and accurate signal output of the pressure sensor element over the lifespan of the device.

As shown in FIG. 1, the force-sensitive material is arranged below the set of drive electrode and sense electrode pairs 130 and bonded to the substrate 110 about the perimeter of the pressure sensor element, forming a small airgap between the set of drive electrode and sense electrode pairs 130 and the force-sensitive material. The force-sensitive material spans gaps between drive electrodes and corresponding sense electrodes and generally exhibits variations in local bulk resistance and/or bulk conductivity responsive to local variations in applied force. During operation, application of a force over the touch sensor surface 116 compresses (e.g., displaces, compacts) the force sensitive material toward the drive electrode and sense electrode pairs 130 such that the resistance between a particular drive electrode and sense electrode pair 130 varies proportionally (e.g., linearly, inversely, quadratically, exponentially) with the local magnitude of force on the touch sensor surface 116. Thus, the controller 180 can sample resistance values (and/or changes in resistance) across each drive electrode and sense electrode pair 130 within the pressure sensor element and can transform these resistance values into a local force magnitude (or force magnitude component) applied over the touch sensor surface 116 at the location of the pressure sensor element. By sampling resistance values across drive electrode and sense electrode pairs 130 in each pressure sensor element in the pressure sensor array, the controller 180 can therefore transform resistance values sampled at each pressure sensor element into a (total) force magnitude and/or location of one or more discrete force inputs applied over the touch sensor surface 116.

In one implementation, the coupon of force-sensitive material includes a (small) air vent—such as a pinhole or channel between the air gap and the external surface of the force sensitive material—in order to continuously equalize air pressure between the air gap and the external environment, thereby preventing pressure build-up or vacuum buildup within the air gap that may otherwise occur responsive to changes in air pressure within the external environment (e.g., due to changes in elevation, changes in internal or external air temperature) and/or responsive to displacement of the touch sensor surface 116 and substrate 110 toward the chassis during operation. Thus, the air gap enables the force sensitive material to maintain consistent mechanical properties and/or dynamics under changing air pressure conditions within the air gap and/or within the external environment.

Furthermore, as shown in FIG. 1, each pressure sensor element includes a deflection spacer 140 bonded to the force-sensitive material (or a substrate 110 arranged beneath force-sensitive material) and the chassis of an electronic device. In one implementation, the deflection spacer 140 defines a pad-like element formed from foam, soft silicone, or ultra-soft silicone of approximately the same diameter as the pressure sensor element (e.g., 3-7 mm). The deflection spacer 140 generally constrains the pressure sensor element against the chassis, but permits the touch sensor surface 116 and/or vibrator elements within the pressure sensor array to oscillate within a plane parallel to the touch sensor surface 116 and the chassis. By constraining oscillation of the touch sensor surface 116, the substrate 110, and/or the pressure sensor element to a plane parallel to the chassis (e.g., constraining motion to all but one or two degrees of freedom), the deflection spacer 140 can substantially reduce inadvertent compression of force-sensitive material when actuating a vibrator during haptic feedback responses, thereby reducing the effect of forces exerted by the vibrator on the substrate 110 and the force-sensitive material from affecting resistance measurements performed by the controller 180. The deflection spacer 140 can also absorb (e.g., reduce, counteract) displacement of other components in the pressure sensor element (e.g., drive electrode and sense electrode pairs 130 and the force-sensitive material) responsive to oscillation or vibration of the touch sensor surface 116 and/or the substrate 110 during haptic feedback cycles, thereby enabling the pressure sensor element to quickly return to an equilibrium position relative to the touch sensor surface 116 following actuation of a vibrator. More specifically, the deflection spacer 140 can exert a restoring (e.g., damping) force that stabilizes and reduces lateral movement of the pressure sensor element over time in order to substantially fix the location of the pressure sensor element relative to a corresponding location on the touch sensor surface 116.

Figure 4:
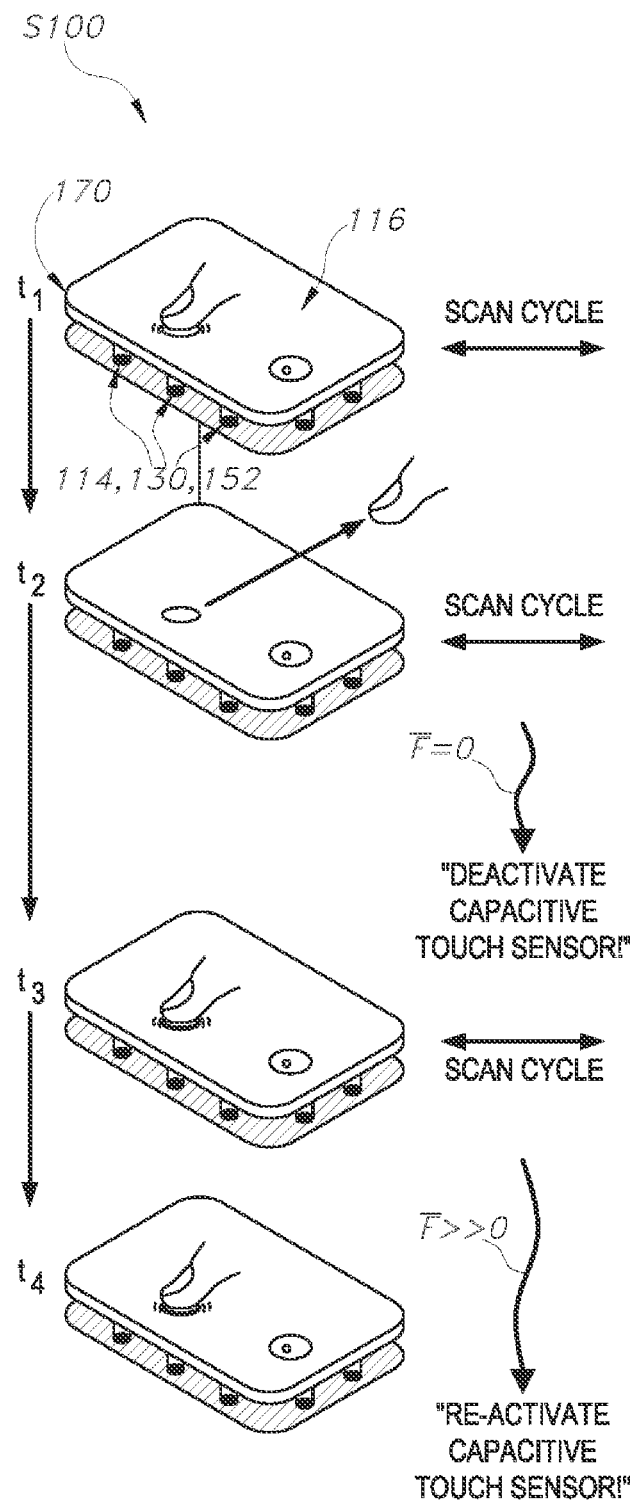
FIG. 4 is a flowchart representation of one variation of the method.

As shown in FIG. 4, a set of these pressure sensor elements can be arranged beneath a touch sensor surface 116 and/or a substrate 110 to form a pressure sensor array with resistive force and/or pressure sensing capabilities at any number of discrete locations below the touch sensor surface 116, thereby enabling a robust, scalable force sensing architecture with reduced manufacturing cost and lower computational requirements (e.g., compared to a continuous sensor array) when detecting and/or characterizing touch inputs.

1.3 Pressure Sensor Array

As shown in FIG. 4, the system 100 includes a set of pressure sensor elements arranged beneath and mechanically and electrically coupled to the substrate 110 at a set of discrete locations under the touch sensor surface 116, and defining a pressure sensor array. Generally, the distance between each pressure sensor element in the pressure sensor array can be substantial relative to the dimensions of the touch sensor surface 116 (e.g., with lateral and longitudinal pitch distances between pressure sensor elements on the order of an inch). However, the pressure sensor array can also include pressure sensor elements arranged under a middle portion of the touch sensor surface 116 and substrate 110 stack (e.g., beneath and/or adjacent to one or more central planar axes of the touch sensor surface 116)—rather than and/or in addition to pressure sensor elements arranged along the perimeter or corners of the touch sensor surface 116—thereby reducing deflection (e.g., bowing) of the middle portion of the touch sensor surface 116 under applied forces.

In one implementation, the pressure sensor array includes a grid array of pressure sensor elements arranged beneath the touch sensor surface 116 and the substrate no (e.g., a 4×3 array, an 8×6 array). In particular, the pressure sensor array can include a first subset of pressure sensor elements arranged proximal to a first edge of the touch sensor surface 116 (e.g., a set of three pressure sensor elements arranged along the left edge of a trackpad surface), a second subset of pressure sensor elements arranged proximal to a second edge of the touch sensor surface 116 opposite the first edge (e.g., a set of three pressure sensor elements arranged along the right edge of the trackpad surface), and a third subset of pressure sensor elements arranged between the first and second subsets of pressure elements (e.g., a set of six pressure sensor elements arranged in the middle portion of the trackpad). For example, the grid array of pressure sensor elements includes a set of six discrete pressure sensor elements at 1.5-inch lateral and longitudinal pitch distances to yield a two-by-three grid array of pressure sensor elements under the touch sensor surface 116 (e.g., a 3-inch by 5-inch touch sensor surface 116). In another example, the grid array can include a set of twelve discrete pressure sensor elements at 0.75-inch lateral and longitudinal pitch distance to yield a three-by-four grid array of pressure sensor elements under the touch sensor surface 116. Additionally and/or alternatively, the pressure sensor array can be scaled to touch sensor surfaces 116 of different sizes—such as by including a different number of rows and/or columns of pressure sensor elements and/or changing the lateral and/or longitudinal pitch distances between pressure sensor elements—in order to mechanically support and provide force-sensing capabilities on a range of touch sensor surfaces 116 sizes.

In this implementation, the set of pressure sensor elements, when coupled to the chassis, mechanically support the substrate 110 and the touch sensor surface 116 by exerting normal forces on the substrate 110 at each grid location. Thus, pressure sensor elements located under the middle portion of the touch sensor surface 116 constrain the touch sensor surface 116 and the substrate 110 against local applications of force, thereby reducing excessive warping and/or deformation of these components (and therefore of force-sensitive material) over the lifespan of the system 100 and maintaining consistent and accurate resistive signal outputs of the pressure sensor array. In variations in which the system 100 includes a capacitive touch sensor 170 (e.g., interposed between the substrate 110 and the touch sensor surface 116), mechanical support of the substrate 110, capacitive touch sensor 170, and touch sensor surface 116 enabled by the pressure sensor array can also reduce strain on the capacitive touch sensor 170 during applications of force to the touch sensor surface 116, maintaining a high degree of accuracy and consistency in outputs of the capacitive touch sensor 170 during operation.

Additionally, by mechanically supporting the touch sensor surface 116 at a set of discrete locations, the array of pressure sensor elements can over-constrain the touch sensor surface 116 and the substrate 110 (e.g., compared to a continuous sensor array or a "four-corner" arrangement with force-sensitive elements beneath each corner of the touch sensor surface 116) such that displacements (e.g., compressions) of the touch sensor surface 116 toward the chassis are substantially localized around local maximums in applied force (e.g., the location of an input). Consequently, surrounding areas of the touch sensor surface 116 may exhibit displacement away from the chassis (e.g., negative displacement) due to mechanical constraints imposed by the array of pressure sensor elements. The force-sensitive material in pressure sensor elements nearest the location of an input applied over the touch sensor surface 116 may therefore exhibit substantially greater compression than the force-sensitive material in distal pressure sensor elements, which disproportionately changes (e.g., decreases) resistances across drive electrode and sense electrode pairs 130 in proximal pressure sensor elements. Likewise, negative displacement of the touch sensor surface 116 may stretch (e.g., expand) the force-sensitive material in surrounding pressure sensor elements, thereby increasing resistances across drive electrodes and sense electrode pairs 130 in these pressure sensor elements. The controller 180 can therefore interpret this pattern of resistance values (or changes in resistance values) in order to derive (e.g., calculate, compute) approximate locations of inputs applied over the touch sensor surface 116.

Thus, the discrete array of pressure sensor elements, in conjunction with the controller 180, can attain a high dynamic range (e.g., force sensitivity) as well as derive approximate locations of forces applied over the touch sensor surface 116 based on known and/or interpolated dynamics of the touch sensor surface 116, even with a small number of drive electrode and sense electrode pairs 130 (e.g., relative to a continuous array of drive electrodes and sense pairs). Additionally and/or alternatively, the system 100 can merge (low-resolution) force data captured by the pressure sensor array with capacitance values and/or a capacitance image captured by an integrated capacitive touch sensor 170, thereby enabling the controller 180 to interpolate (e.g., approximate) force distributions across the touch sensor surface 116 based on (high-resolution) capacitance data. While the examples above relate to a relatively small (e.g., 4×3) array of pressure sensor elements, the pressure sensor array can be scaled to larger form factors and/or resolutions in order to mechanically support and provide force sensing capabilities for input devices defining larger touch sensor surfaces 116 (e.g., a 5-inch by 11-inch keyboard surface, a touch display of a tablet computer).

In this implementation, each pressure sensor element in the pressure sensor array can be electrically coupled to the controller 180 and/or other pressure sensor elements by a set of drive lines and sense lines routed through the substrate 110. Thus, the controller 180 can continuously and/or intermittently measure (e.g., sample) resistance values from each drive electrode and sense electrode pair 130 in each pressure sensor element in the pressure sensor array in order to determine force magnitudes and/or locations of inputs applied over the touch sensor surface 116. In this arrangement, drive lines and sense lines connected to drive electrode and sense electrode pairs 130 in the pressure sensor array define a grid array including nodes (e.g., crossovers) at the location of each pressure sensor element. For example, a set of drive electrodes in each pressure sensor element within a row of pressure sensor elements can be connected to a common drive line routed through the substrate 110 to the controller 180. Additionally, a set of corresponding sense electrodes (e.g., defining drive electrode and sense electrode pairs 130 with the set of drive electrodes) in each pressure sensor element within a column of pressure sensor elements can be connected to a common sense line routed through the substrate 110 to the controller 180. Due to the lateral and longitudinal pitch distances between pressure sensor elements in the pressure sensor array, the grid arrangement of drive lines and sense lines is compact and occupies a small portion of the area of the substrate 110 (e.g., relative to a continuous grid array of electrode pairs 130), thereby enabling haptic feedback components, controllers 180, and other circuit components to be embedded in, deposited on, or otherwise integrated directly with the bottom surface of the substrate 110, reducing the total stack height of the system 100.

Generally, the system 100 also includes a haptic feedback module, including a set of vibrators arranged under the touch sensor surface 116 and electrically coupled to the controller 180. During operation, the controller 180 is generally configured to drive the set of vibrators to oscillate the touch sensor surface 116 in response to detecting an input on the touch sensor surface 116 (e.g., exceeding a threshold force or pressure) in order to output haptic feedback that mimics the sound and/or tactile sensation of depression and release (e.g., actuation) of a mechanical snap button (e.g., trackpad click) or a mechanical key.

In one implementation, the system 100 includes a set of vibrators arranged under the touch sensor surface 116 and/or the substrate 110 and proximal to the perimeter of the substrate 110. For example, each vibrator can define an inductor—such as multi-loop wire or trace coil bonded to the inner surface of the substrate 110—paired with a magnetic element 194 interposed between the inductor and the chassis. In this example, polarization of one or more inductors (e.g., via a drive current of a particular waveform output by the controller 180 and/or a haptic feedback module coupled to the controller 180) oscillates an eccentric mass defined by the substrate 110 and the touch sensor surface 116 in order to generate a vibratory feedback signal that mimics actuation of a mechanical button and/or key, such as a trackpad "click" or mechanical keystroke.

In another implementation, the set of vibrators is arranged into a grid array offset from the grid array of pressure sensor elements such that each vibrator is positioned between a subset of pressure sensor elements. In this implementation, the controller 180 (e.g., a haptic feedback sub-controller 180 within the controller 180) can be configured to selectively drive (e.g., oscillate) a subset of vibrators in the grid array closest to a local maximum in applied force and/or calculated location of an input on the touch sensor surface 116 in order to localize haptic feedback around the input location. Additionally, this grid arrangement enables the system 100 to incorporate vibrators of smaller physical dimensions into the haptic feedback module, thereby reducing the total stack height of the system 100.

In yet another implementation, in which the substrate 110 defines a multi-layer PCB, the set of vibrators can include a set of inductors formed within and/or directly integrated into one or more layers of the multi-layer PCB. For example, the system 100 can include: a set of multi-loop wire or trace coils electrically coupled to the controller 180 (e.g., a haptic feedback sub-controller 180 within the controller 180) within one or more regions of the lower layer(s) of the multi-layer PCB; and a set of magnetic elements 194 (e.g., ferrous elements, permanent magnets) interposed between the multi-layer PCB and the chassis and aligned with the set of multi-loop wire coils, thereby significantly reducing the total stack height of the system 100. In this implementation, the lower layer of the PCB can define a conductive ground plane—such as a layer of copper or other conductive material spanning the area of the pressure sensor array and electrically coupled to the controller 180—that is notched or otherwise split proximal to one or more coils. While scanning resistance values across drive electrode and sense electrode pairs 130 in the pressure sensor array, the controller 180 can drive the ground plane and the set of inductors to a ground and/or virtual reference potential to shield the drive electrode and sense electrode pairs 130 from external electromagnetic radiation, thereby increasing the signal-to-noise ratio and improving the accuracy of resistive signal outputs of the pressure sensor array. Additionally and/or alternatively, the controller 180 can be configured to pause scanning of the pressure sensor array during a haptic feedback cycle (e.g., output of a haptic feedback response), and resume scanning the pressure sensor array upon completion of the haptic feedback cycle, thereby reducing interference between magnetic fields—induced by polarization of the inductors—and resistive signals sampled from underlying drive electrode and sense electrode pairs 130.

1.4 Capacitive Touch Sensor

As shown in FIG. 4, one variation of the system 100 includes a capacitive touch sensor 170 (e.g., a mutual projected capacitance sensor 120, a self-capacitance sensor 120) arranged over the pressure sensor array. In particular, the capacitive touch sensor 170 can be arranged over the substrate 110, while the pressure sensor array can be arranged under the substrate 110 opposite the capacitive touch sensor 170. The capacitive touch sensor 170 can define a standalone or discrete touch sensor that includes a set of capacitance drive electrodes and capacitance sense electrodes that form a grid array across the top layer in of substrate 110. The number of drive electrode and sense electrode pairs 130 in the set of capacitance drive and capacitance sense electrodes may be substantially (e.g., two orders of magnitude) greater than the number of drive electrode and sense electrode pairs 130 in the pressure sensor array.

Generally, the substrate 110 includes a layer of flexible material that can flex and deform under minimal applied load in order to transmit forces exerted over the touch sensor surface 116 (e.g., from an input) through the substrate 110 to force-sensitive materials in pressure sensor elements, thereby enabling forces exerted over the touch sensor surface 116 to effect resistance changes across drive electrode and sense electrode pairs 130 in the pressure sensor array. The capacitive touch sensor 170 can include and/or interface with a capacitance controller 180 within the controller 180 configured to generate and output a capacitive touch image representing the location, size, and/or duration of inputs on the touch sensor surface 116, as described in more detail below.

1.5 Controller

Generally, the controller 180 includes a pressure sensor sub-controller 180, a capacitive sensor sub-controller 180, and/or a haptics sub-controller 180. The pressure sensor sub-controller 180 within the controller 180 functions to drive the pressure sensor array, to read resistance values between drive electrode and sense electrode pairs 130 in the pressure sensor array during a scan cycle, to transform resistance data sampled from the pressure sensor array into magnitudes of force inputs over the touch sensor surface 116, and to derive (e.g., interpolate, calculate) an approximate location of the input on the touch sensor surface 116 based on observed variations in resistance among discrete pressure sensor elements and/or observed resistance gradients across drive electrode and sense electrode pairs 130 within the pressure sensor elements.

In one implementation, the pressure sensor sub-controller 180 includes: an array column driver (ACD); a column switching register (CSR); a column driving source (CDS); an array row sensor (ARS); a row switching register (RSR); and an analog to digital converter (ADC). In this implementation, the touch sensor 110 can include a variable impedance array (VIA) that defines: interlinked impedance columns (IIC) coupled to the ACD; and interlinked impedance rows (IIR) coupled to the ARS. During a resistance scan cycle: the ACD can select the IIC through the CSR and electrically drive the IIC with the CDS; the VIA can convey current from the driven IIC to the IIC sensed by the ARS; the ARS can select the IIR within the pressure sensor array and electrically sense the IIR state through the RSR; and the pressure sensor sub-controller 180 can interpolate sensed current/voltage signals from the ARS to achieve substantially accurate detection of proximity, contact, pressure, and/or spatial location of a discrete force input over the touch sensor 110 for the resistance scan cycle within a single sampling period or over multiple sampling periods.

In one implementation, a row of drive electrodes in the pressure sensor array can be connected in series, and a column of sense electrodes in the pressure sensor array can be similarly connected in series. During a sampling period, the pressure sensor sub-controller 180 can: drive a first row of drive electrodes to a reference voltage while floating all other rows of drive electrodes; record a voltage of a first column of sense electrodes while floating all other columns of sense electrodes; record a voltage of a second column of sense electrodes while floating all other columns of sense electrodes; record a voltage of a last column of sense electrodes while floating all other columns of sense electrodes; drive a second row of drive electrodes to the reference voltage while floating all other rows of drive electrodes; record a voltage of the first column of sense electrodes while floating all other columns of sense electrodes; record a voltage of the second column of sense electrodes while floating all other columns of sense electrodes; record a voltage of the last column of sense electrodes while floating all other columns of sense electrodes; and finally drive a last row of drive electrodes to the reference voltage while floating all other rows of drive electrodes. The pressure sensor sub-controller 180 can then record a voltage of the first column of sense electrodes while floating all other columns of sense electrodes; record a voltage of the second column of sense electrodes while floating all other columns of sense electrodes; and record a voltage of the last column of sense electrodes while floating all other columns of sense electrodes in Block S110. The pressure sensor sub-controller 180 can thus sequentially drive rows of drive electrodes in the pressure sensor array; and sequentially read resistance values (e.g., voltages) from columns of sense electrodes in the pressure sensor array.

The capacitance sub-controller 180 can execute a similar process to: sequentially drive rows of capacitance drive electrodes in the capacitive sensor; sequentially sample capacitance values (e.g., voltages) from columns of capacitance sense electrodes in the capacitive sensor; interpolate the sampled capacitance values to derive a location, size, and/or duration of a touch input on the touch sensor surface 116 and/or proximity of an object to the touch sensor surface 116; and output a touch image representing the touch input.

In one implementation, the pressure sensor sub-controller 180 and capacitive sensor sub-controller 180 interface with a master controller 180 within the controller 180, thereby integrating the pressure sensor sub-controller 180 and capacitive sensor sub-controller 180 into a single input device (e.g., a trackpad, a keyboard, a touch-sensitive display). Generally, the master controller 180 is configured to compare and/or combine pressure (e.g., force) data and capacitive touch data in order to: confirm and/or characterize an input or object at the touch sensor surface 116; generate a touch image (e.g., an annotated touch image) representing total force exerted over the touch sensor surface 116 or a pressure distribution across the touch sensor surface 116 during a scan cycle, as well as locations, sizes, and/or proximity of objects near the touch sensor surface 116 during the scan cycle (e.g., based on both resistance and capacitance data); and to output the (annotated) touch image and/or access a preprogrammed command function that corresponds to the touch image. In another implementation, the pressure sensor sub-controller 180 and the capacitive sensor sub-controller 180 are integrated into a single controller 180 configured to execute the processes described above and Blocks of the method S100 in order to detect and characterize touch inputs on the touch sensor surface 116.

1.6 Pressure Sensor Resolution

In one implementation, each pressure sensor element includes a set of (e.g., interdigitated) drive electrode and sense electrode pairs 130. For example, the set of drive electrode and sense electrode pairs 130 can be arranged into a linear array (e.g., across the diameter of the pressure sensor element). In this example, the controller 180 can measure a resistance value (or change in resistance) across each pair of drive electrodes and sense electrodes during a given pressure scan cycle. However, each drive electrode and sense electrode pair 130 may exhibit a slightly different resistance than adjacent drive electrode and sense electrode pairs 130 due to local variations in applied force. For example, a drive electrode and sense electrode pair 130 that is closer to the location of an input on the touch sensor surface 116 (i.e., closer to a local maximum in applied force) may exhibit a greater change in resistance between the drive electrode and sense electrode than a drive electrode and sense electrode pair 130 that is further from the input location. Thus, the controller 180 can interpret local variations in resistance values across drive electrode and sense electrode pairs 130 in this linear arrangement as part of a one-dimensional gradient in force and/or pressure applied over touch sensor surface 116. When sampling (e.g., measuring) resistance values across drive electrode and sense electrode pairs 130 in each pressure sensor element in the pressure sensor array, the controller 180 can therefore derive (e.g., calculate, compute) approximate locations of local and/or global maximums in applied force at the touch sensor surface 116 based on gradient information from each pressure sensor element, which may correspond to locations of inputs applied over the touch sensor surface 116. The controller 180 can then further interpolate a (approximate) force distribution across the touch sensor surface 116 based sampled resistance values and resistance (e.g., force) gradients across drive electrodes and sense electrode pairs 130 in each pressure sensor element.

In another example, the pressure sensor element includes a set of (e.g., interdigitated) drive electrode and sense electrode pairs 130 arranged to form a two-dimensional array. For example, the two-dimensional array can include a first linear array of drive electrode and sense electrode pairs 130 arranged along a first axis (e.g., across the diameter of pressure sensor element) and a second linear array of drive electrode and sense electrode pairs 130 arranged along a second axis that is orthogonal to the first axis. For example, the two linear arrays of electrode pairs 130 define an "L"-shaped arrangement (e.g., such that the first axis and the second axis extend unidirectionally from a shared origin). In another example, the two linear arrays of electrode pairs 130 define a cross-shaped arrangement (e.g., each axis perpendicularly bisects the other).

In another implementation, the drive electrode and sense electrode pairs 130 can define a grid array such that drive electrodes and/or sense electrodes are located at each position in a set of rows and columns. Thus, the controller 180 can interpret local variations in resistance values across drive electrodes and sense electrode pairs 130 (e.g., due to small local variations in applied force) in these two-dimensional arrangements as part of a two-dimensional gradient in force and/or pressure applied over touch sensor surface 116. When sampling (e.g., measuring) resistance values across drive electrode and sense electrode pairs 130 in each pressure sensor element in the pressure sensor array, the controller 180 can therefore determine (e.g., calculate, compute) approximate locations of local and/or global maximums in applied force at touch sensor surface 116 based on gradient information from each pressure sensor element, which may correspond to locations of inputs applied over the touch sensor surface 116. The controller 180 can further interpolate a force distribution across the touch sensor surface 116 based sampled resistance values and resistance (e.g., force) gradients across drive electrodes and sense electrode pairs 130 in each pressure sensor element.

1.7 Force Characterization

Blocks of the method S100 recite: detecting a touch input at a touch sensor surface 116 arranged above a pressure sensor including an array of pressure sensor elements at Block S110; and sampling a resistance value at a drive electrode and sense electrode pair 130 in each pressure sensor element in the pressure sensor array to obtain a set of resistance values at Block S120. Generally, the controller 180 is configured to: detect presence and/or application of an input at the tactile based on capacitance data sampled from capacitance drive electrodes and sense electrode pairs 130 in the capacitive touch sensor 170 and/or resistance data sampled from drive electrode and sense electrode pairs 130 in a pressure sensor element; and execute a pressure scan cycle as described above in order to sequentially sample resistance values across each drive electrode and sense electrode pair 130 in each pressure sensor element in the pressure sensor array. In one implementation, the controller 180 (e.g., the capacitive sensor sub-controller 180) can simultaneously sample a set of capacitance values across each capacitance drive electrodes and sense electrode pair 130 in the capacitive sensor or access a set of capacitance values sampled in a previous scan cycle.

Blocks of the method S100 further recite: transforming the set of resistance values into a set of magnitude components of a force exerted over the touch sensor surface 116 by the touch at Block S130; and calculating a magnitude of the force based on the set of magnitude components at Block S140. Generally, the controller 180 is configured to: interpret resistance values sampled from drive electrodes and sense electrode pairs 130 in a pressure sensor element as a magnitude of the net force applied to the touch sensor surface 116 (e.g., due to application of the touch input) at the location of the pressure sensor element; iterate this analysis over all pressure sensor elements in the pressure sensory array; and combine each derived magnitude component to calculate the total force applied over the touch sensor surface 116 during the pressure scan cycle. In one implementation, the controller 180 transforms the set of resistance values into force magnitude components by comparing resistance values sampled from each drive electrodes and sense electrode pair 130 to calibration data obtained from the pressure sensor array. For example, the controller 180 can mask, scale, and/or normalize resistance values and/or force magnitudes derived from these resistance values according to a set of scaling factors calculated for each pressure sensor during a calibration process executed prior to operation. Additionally and/or alternatively, the controller 180 can transform the set of resistance values into force magnitude components based on derived correlations between applied force (e.g., force exerted on the force-sensitive material) and resistance (or a change in resistance) between drive electrodes and sense electrodes in the pressure sensor element. The controller 180 can then sum over all force magnitude components calculated for each pressure sensor element to calculate (e.g., determine, derive) the total force applied over the touch sensor surface 116 by the touch input during the pressure scan cycle.

Blocks of the method S100 further recite: deriving an estimated location of the touch input on the touch sensor surface 116 based on differences between magnitude components in the set of magnitude components at Block S150. As described above, pressure sensor elements arranged beneath the middle portion of the touch sensor surface 116 exert normal forces on the touch sensor surface 116 that can over-constrain the touch sensor surface 116. Thus, each pressure sensor element in the array can experience different forces based on their respective proximities to the input location. In particular, pressure sensor elements proximal to a local maximum in force applied over the touch sensor surface 116 (e.g., the location of a touch input) may experience disproportionately large force magnitudes, while pressure sensor elements further away from these local maxima may experience relatively small or even net negative force magnitudes (e.g., displacement of the touch sensor surface 116 away from the chassis). The controller 180 is therefore configured to: analyze the force magnitude components calculated at each pressure sensor element; derive (e.g., determine, compute) a location estimation for local maxima in force applied over the touch sensor surface 116 based on differences between force magnitude components measured at the location of these pressure sensor elements (e.g., by comparing to calibration data); and correlate the location estimation with the location of an input on the touch sensor surface 116. In implementations where pressure sensor elements include an array of drive electrode and sense electrodes, the controller 180 can further interpret measured variations in resistance between adjacent drive electrode and sense electrode pairs 130 as a gradient of force applied over each pressure sensor element. Thus, the controller 180 can analyze the set of gradients calculated at pressure sensor elements in order to estimate and/or refine its estimated location of local maxima in applied force. The controller 180 can also calculate a location of the input based on a set capacitance values sampled from a capacitive touch sensor 170, compare the location derived from these capacitance values to the estimated location derived from force magnitude components and, if necessary, correct the estimated location when generating a touch image corresponding to the input.

Blocks of the method S100 further recite: generating a pressure image associated with the touch input representing a force distribution across the touch sensor surface 116 and the estimated location of the touch input at Block S160. Generally, the controller 180 is configured to generate a pressure image corresponding to the touch input that includes a force distribution across the area of the touch sensor surface 116 (e.g., a pressure map) produced by the touch input over the pressure scan cycle. The controller 180 can also annotate the pressure image (e.g., the force distribution) with a (x,y) location or a bounded curve corresponding to the estimated location of the touch input on the touch sensor surface 116. In one variation in which the system 100 includes a capacitive touch sensor 170, the controller 180 can be configured to generate a capacitance image (e.g., at the capacitance sub-controller 180) representing the location, size, and/or proximity of objects on the touch sensor surface 116 during a capacitance scan cycle corresponding to a resistive scan cycle of the pressure sensor array. As described in more detail below, the controller 180 can then combine (e.g., overlay, integrate) the capacitance image with the pressure image and output an annotated touch image.

Blocks of the method S100 further recite: in response to the magnitude of the force exceeding a threshold magnitude, selectively driving a vibrator in a set of vibrators closest to the estimated location of the touch input to oscillate the touch sensor surface 116 at Block S110. Generally, the controller 180 is configured to: compare the calculated force magnitude to a threshold magnitude; select a vibrator from a set of vibrators based on proximity to the location of the touch input on the touch sensor surface 116; and drive the selected vibrator in order to generate oscillation of the touch sensor surface 116 (e.g., without driving other vibrators in the set of vibrators). Thus, the controller 180 (e.g., a haptic feedback sub-controller 180 within the controller 180) can deliver a haptic feedback response (e.g., a vibratory signal) that is substantially localized to the area of touch inputs on the touch sensor surface 116 to mimic the tactile response of a mechanical snap button in response to inputs exceeding a predetermined force magnitude (e.g., 160 g). Additionally, the controller 180 can drive the selected vibrator such that the amplitude, frequency and/or duration of oscillation is proportional to the magnitude of the input force in order to customize haptic feedback responses to input characteristics.

1.8 Merging Force and Capacitance Data

In one variation in which the system 100 includes a capacitive touch sensor 170 arranged over the pressure sensor array, the controller 180 is configured to execute Blocks of the method S100 in order to: characterize force magnitudes of a set of inputs over the touch sensor surface 116 based on (low resolution) resistance data sampled from the pressure sensor array; concurrently detect locations and sizes of the set of inputs based on (high resolution) capacitance data concurrently sampled from the capacitive touch sensor 170; and combine the resistance data and capacitance data to generate a force-annotated touch image(s) representing these input characteristics. The controller 180 can therefore: augment high resolution capacitance data (e.g., a capacitance image) with force magnitude data captured by the pressure sensor array without significant increases to the controller 180's power and/or compute requirements; and leverage force magnitude data captured by the pressure sensor array to identify, discard and/or suppress false or errant input areas represented in the capacitance data to improve the accuracy and consistency of system outputs.

In one variation, the controller 180 defines a single controller 180 electrically coupled to both the pressure sensor array and the capacitive touch sensor 170. Thus, in this variation, the controller 180 is configured to: scan the (low-resolution) pressure sensor array and the (high-resolution) capacitive touch sensor 170 at the same scan frequency (i.e., one scan of the pressure sensor array concurrent with, overlapping, or immediately following each scan of the capacitive touch sensor 170); and fuse pressure and capacitance scan pairs into a force-annotated touch image for each scan cycle. In particular, the controller 180 can: read a set of capacitance values from capacitive electrodes and/or capacitive electrode pairs 130 in the capacitive touch sensor 170 during a scan cycle; and concurrently scan a set of resistance values across each drive electrode and sense electrode pair 130 in the pressure sensor array during this scan cycle (e.g., during a second period of time within this scan cycle); transform the set of resistance values into force magnitudes (or force magnitude components, force gradients) of a set of inputs applied over the touch sensor surface 116 during the scan cycle; transform the set of capacitance values into a capacitance image representing locations and sizes of these inputs on the touch sensor surface 116; and label input regions in the capacitance image with corresponding force magnitudes (and/or force magnitude components, force gradients), thereby generating a force-annotated touch image representing locations, sizes, and force characteristics of the set of inputs on the touch sensor surface 116 during the scan cycle.

Furthermore, as shown in FIG. 3, the controller 180 can leverage low resolution force data captured by the pressure sensor array to identify a false and/or errant input area within high resolution capacitance image based on discrepancies between capacitance data representing particular input areas and force magnitudes corresponding to these input areas. In particular, the controller 180 can suppress, normalize, or subtract out capacitance values within a region of touch images, captured during subsequent scan cycles, in response to detecting absence of an accompanying force in order to reduce instances of false positive input detection, such as due to presence of liquid on the touch sensor surface 116. For example, over a sequence of ten scan cycles, the controller 180 can: detect an increase in capacitance values within a region of the capacitive touch sensor 170; concurrently detect absence of forces applied over the touch sensor surface 116 based on resistance data sampled from the pressure sensor array (e.g., or forces falling below a threshold force magnitude); flag the increase in capacitance values as an errant input; and normalize and/or mask these capacitance values from a corresponding region of touch images generated during subsequent scan cycles. Thus, the controller 180, in conjunction with the pressure sensor array, can identify and correct instances of false positive input detection by the capacitive touch sensor 170 in order to improve the accuracy and consistency of outputs of the system 100.

1.9 Rapid Scanning

In another variation, the controller 180 includes: a capacitance sub-controller 180 electrically coupled to the capacitive touch sensor 170 and configured to scan capacitance values across capacitive electrodes in the capacitive touch sensor 170 at a first scan frequency; and a pressure sub-controller 180 configured to scan resistance values across drive electrode and sense electrode pairs 130 in the pressure sensor array at a second scan frequency. In this variation, the controller 180 can sample resistance values across the (low-resolution) pressure sensor array over a scan period that is orders of magnitude shorter than a scan period in which the system 100 scans the (high-resolution) capacitive touch sensor 170, as shown in FIG. 4. For example, during one 50-millisecond scan cycle, the controller 180 can: sample the pressure sensor array ten times on a five-millisecond interval; calculate average force magnitudes applied to the touch sensor surface 116 and/or rates of change of these applied forces during this scan cycle based on these resistance values; and activate the capacitive touch sensor 170 for the next scan cycle if average forces applied to the touch sensor surface 116 exceeds a threshold magnitude or if forces applied to the touch sensor surface 116 are changing during the scan cycle. During the next 50-millisecond scan cycle, the controller 180 can: sample the (low-resolution) pressure sensor array ten times on a five-millisecond interval; calculate average force magnitudes applied to the touch sensor surface 116 and/or rates of change of these applied forces during this next scan cycle based on these resistance values; sample the capacitive touch sensor 170 once during this next scan cycle; deactivate the capacitive touch sensor 170 if no touch is represented in these capacitance values; and then fuse these capacitance values and the average forces applied to the touch sensor surface 116 and/or rates of changes of forces—derived from concurrent resistance data—into one force-annotated touch image for this next scan cycle.

In one implementation, the controller 180 can execute a sequence of resistive scan cycles (e.g., ten scan cycles, 100 scan cycles) during each capacitive scan cycle executed by the capacitance sub-controller 180 and rapidly detect inputs over the touch sensor surface 116 based on (only) force magnitudes and/or resistance data sampled during one or more of these resistive scan cycles. The controller 180 can then access and/or execute command functions—such as cursor clicks or keystrokes—immediately succeeding detection of the input via the pressure sensor array (e.g., prior to completion of a corresponding capacitive scan cycle) in order to reduce the latency and/or delay between applications of inputs to the touch sensor surface 116 and execution of corresponding command functions. For example, during a 50-millisecond scan cycle, the controller 180 can: sample the capacitive touch sensor 170 once over a so-millisecond capacitance scan period; concurrently sample the pressure sensor array ten times over a sequence of ten five-millisecond pressure scan periods; calculate a force magnitude applied over the touch sensor surface 116 during each pressure scan period; and, in response to one or more of these force magnitudes exceeding a threshold force magnitude, select and/or output a command function prior to the conclusion of the so-millisecond capacitance scan period. Thus, the controller 180 can rapidly detect initial application of an input to the touch sensor surface 116 and/or calculate force magnitudes of inputs occurring over a short period of time (e.g., a tap of a stylus/fingertip) to the touch sensor surface 116 based on changes in resistance between drive electrode and sense electrode pairs 130 prior to fully scanning the capacitive touch sensor 170. The controller 180 can then immediately select and/or output certain command functions such as a cursor click upon detecting such inputs, thereby reduce the latency between application of an input to the touch sensor surface 116 and execution of a particular command function associated with the input by or in conjunction with the controller 180.

Additionally and/or alternatively, the controller 180 can detect a velocity and/or impulse (i.e., force integral over time) of the input over a sequence of high-frequency resistive scan cycles. For example, during a given capacitive scan cycle, the controller 180 can: execute a sequence of resistive scan cycles at a particular scan frequency; characterize a sequence of force magnitudes applied by an input over the touch sensor surface 116 based on resistance values captured by the pressure sensor array during each resistive scan cycle; and calculate an impulse applied by the input over the touch sensor surface 116 based on the sequence of force magnitudes and the particular scan frequency. The controller 180 can then modify haptic feedback responses and/or command functions selected in response to the input based on the impulse and/or velocity of the input. For example, if the system 100 is integrated into an electronic instrument or a device (e.g., a tablet, a laptop computer) executing a music application, the controller 180 can select a particular volume and/or rise and fall times of a musical note output by the electronic instrument and/or device based on the impulse and/or velocity of the input.

Furthermore, by rapidly scanning the pressure sensor array, the controller 180 can maintain the high-resolution capacitive touch sensor 170 in an idle (e.g., low-power) state until a force (e.g., an input) is detected on the touch sensor surface 116. In particular, as shown in FIG. 4, the controller 180 can: continuously scan resistance values from the pressure sensor array over a first period of time; maintain the capacitive sensor in an idle (e.g., low-power, undriven) mode during the first period of time; at a second time immediately succeeding the first period of time, detect application of an input of a first force magnitude based on resistance values sampled by the pressure sensor array; in response to the first force magnitude exceeding a threshold force magnitude, transition the capacitive sensor to an active mode at approximately the second time in order to sample changes in capacitance within the capacitive sensor responsive application of the input. Thus, the system 100 can idle the capacitive sensor while (e.g., continuously) scanning the (low-resolution) pressure sensor array until the pressure sub-controller 180 detects a statistically significant force applied to the touch sensor surface 116, thereby substantially reducing power consumption of the capacitive sensor, and thus power consumption of the system 100 during operation.

2. Force by Resistance

Figure 6:
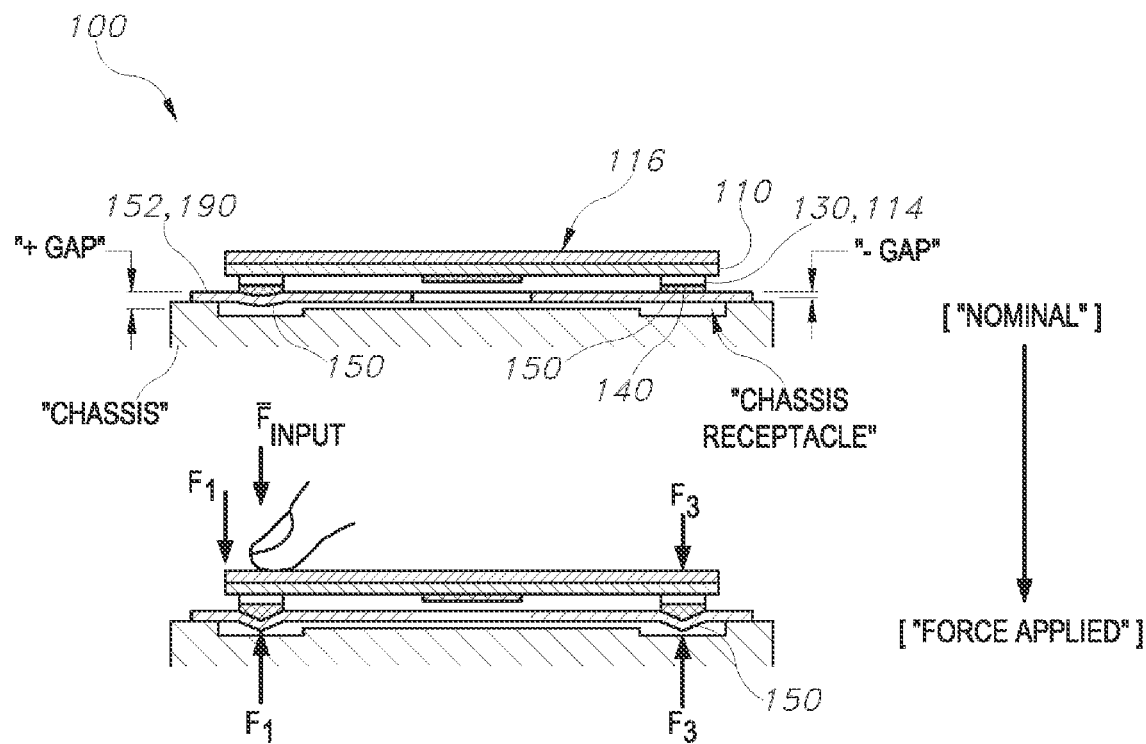
FIG. 6 is a schematic representation of one variation of the system.

As shown in FIGS. 5 and 6, one variation of a system for detecting inputs at a computing device includes: a substrate 110 including a top layer 111, a bottom layer 112 defining an array of support locations 114, and an array of electrode pairs 130 arranged on the bottom layer 112, each electrode pair 130 in the array of electrode pairs 130 occupying a support location 114 in the array of support locations 114; and a touch sensor surface 116 arranged over the top layer in of the substrate 110. This variation of the system 100 also includes a set of spacers 140, each spacer 140 in the set of spacers 140: arranged over an electrode pair 130, in the array of electrode pairs 130, at a support location 114, in the array of support locations 114, on the bottom layer 112 of the substrate 110; and including a force-sensitive material exhibiting variations in local bulk resistance responsive to variations in applied force. This variation of the system 100 further includes: an array of spring elements 150 configured to support the substrate 110 on a chassis and to yield to displacement of the substrate 110 downward toward the chassis responsive to forces applied to the touch sensor surface 116, each spring element 150 in the array of spring elements 150 coupled to a spacer 140, in the set of spacers 140, at a support location 114 in the array of support locations 114; and a controller 180 configured to read resistance values from the array of electrode pairs 130 and interpret force magnitudes of inputs applied to the touch sensor surface 116 based on resistance values read from the array of electrode pairs 130.

Figure 9:
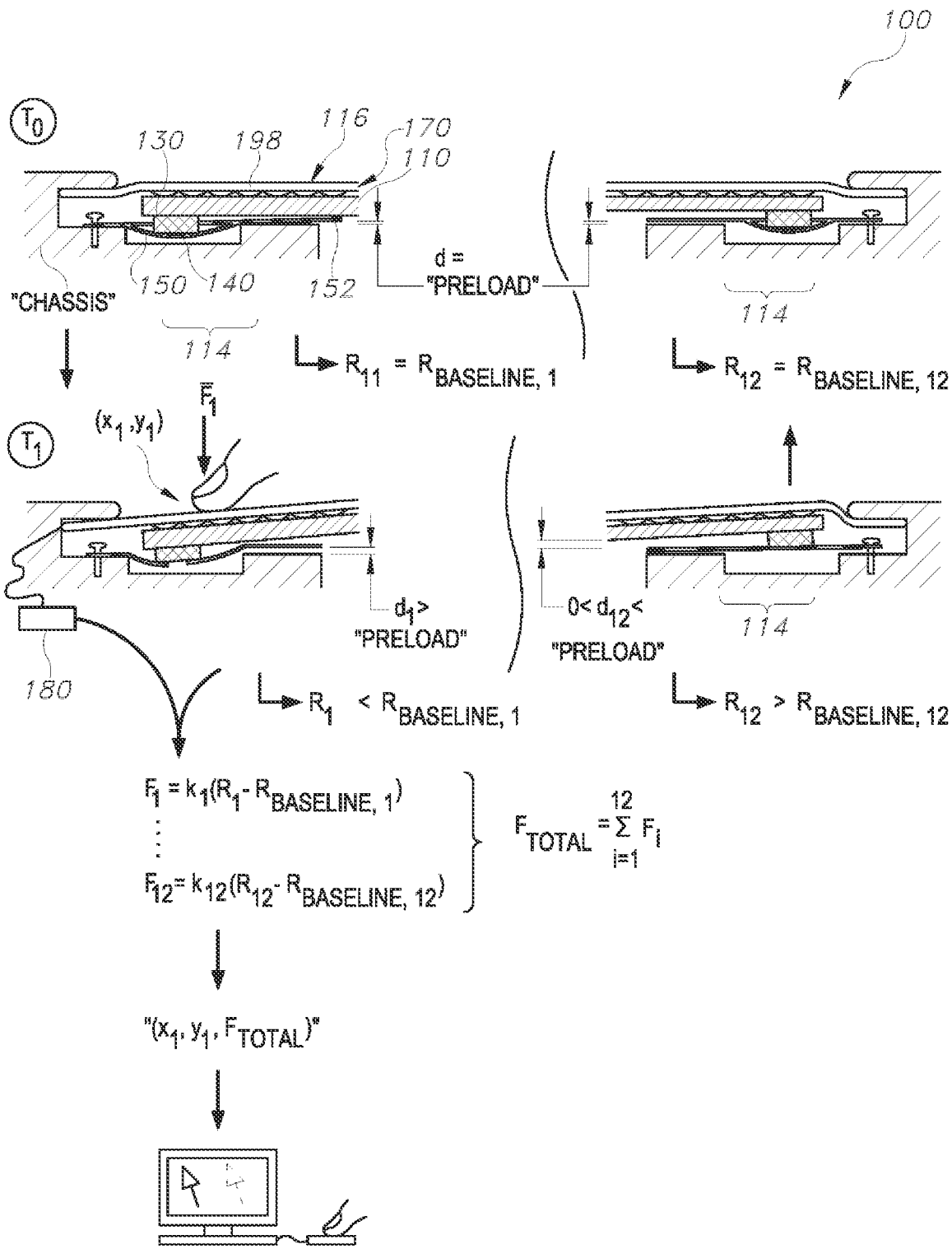
FIG. 9 is a flowchart representation of one variation of the system.

As shown in FIG. 9, one variation of the system 100 includes: a substrate 110 including a top layer 111, a bottom layer 112, and an array of electrode pairs 130 arranged on the bottom layer 112; an array of drive electrodes and sense electrodes arranged on the top layer in of the substrate 110; and a touch sensor surface 116 arranged over the array of drive electrodes and sense electrodes. This variation of the system 100 also includes a set of spacers 140, each spacer 140 in the set of spacers 140: arranged over an electrode pair 130, in the array of electrode pairs 130, on the bottom layer 112 of the substrate 110; and including a force-sensitive material exhibiting variations in local bulk resistance responsive to variations in applied force. This variation of the system 100 further includes an array of spring elements 150 configured to support the substrate 110 on a chassis and to yield to displacement of the substrate 110 downward toward the chassis responsive to forces applied to the touch sensor surface 116, each spring element 150 in the array of spring elements 150 coupled to a spacer 140 in the set of spacers 140. This variation of the system 100 also includes a controller 180 configured to, during a scan cycle: read a set of capacitance values between drive electrodes and sense electrodes in the array of drive electrodes and sense electrodes; read a set of resistance values across electrode pairs 130 in the array of electrode pairs 130; detect a lateral position and a longitudinal position of a touch input on the touch sensor surface 116 based on the set of capacitance values; interpret a force magnitude of the touch input based on the second set of resistance values; and output the lateral position, the longitudinal position, and the force magnitude of the touch input.

2.1 Applications

Generally, in this variation, the system 100 includes a set of spring elements 150 that: vertically support discrete pressure sensors—arranged across the bottom layer 112 of the substrate 110—against the chassis; and yield to a force applied to the touch sensor surface 116, thereby enabling this force to compress the nearest pressure sensors. The spring elements 150 also absorb distortion across the substrate 110 due to local forces applied to the touch sensor surface 116, thereby limiting or preventing tension across other pressure sensors further from this application force, which may otherwise separate spacers 140 from electrode pairs 130 in these other pressure sensors and thus prevent reliable detection of resistance values from these other pressure sensors.

Therefore, the set of spring elements 150 can cooperate to: maintain contact between spacers 140 and their corresponding electrode pairs 130 across all pressure sensors in the system 100; enable the controller 180 to read a resistance from each pressure sensor; and thus enable the controller 180 to accurately interpret a total force applied to a touch sensor surface 116 (i.e., because the set of springs elements cooperate to maintain the state of each pressure sensor within its sensible dynamic range) over a range of force magnitudes and locations of inputs applied to the touch sensor surface 116.

2.2 Substrate

As described above and shown in FIG. 6, in this variation, the substrate 110 can include a fiberglass PCB including: a top layer 111; and a bottom layer 112 that defines an array of support locations 114.

Figure 7:
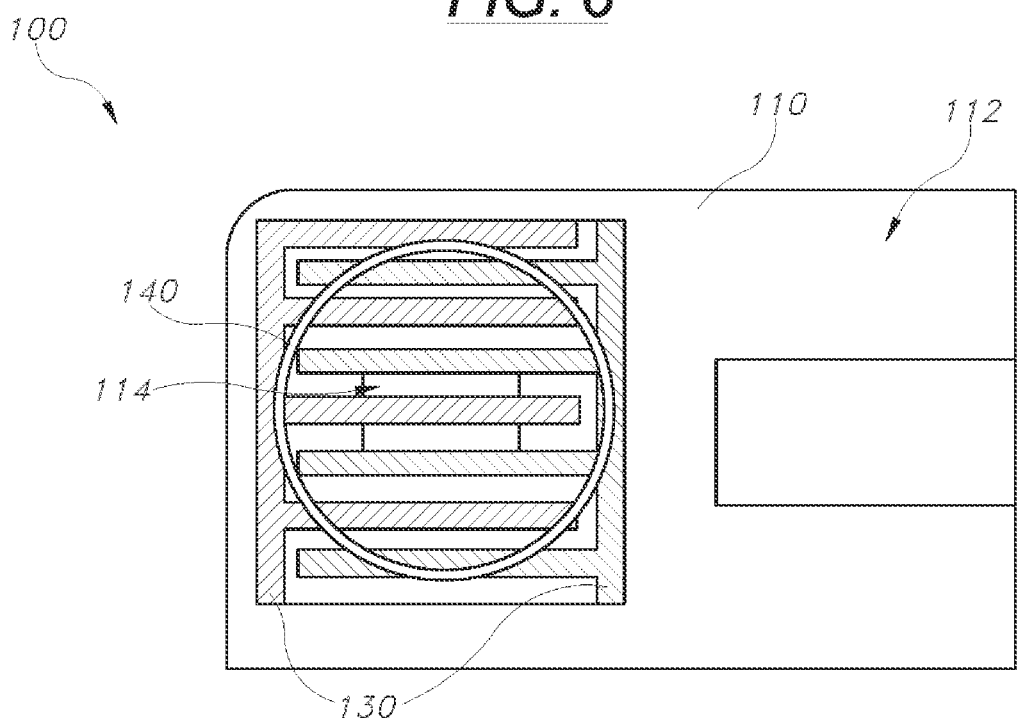
FIG. 7 is a schematic representation of one variation of the system.

The substrate 110 further includes an array of electrode pairs 130 arranged at the array of support locations 114 across the bottom layer 112. For example, each electrode pair 130 can include a pair of interdigitated electrodes extending across a support location 114—in the array of support locations 114—on the bottom layer 112 of the substrate 110, as shown in FIG. 7.

2.3 Capacitive Touch Sensor

As described above and shown in FIG. 9, in this variation, the system 100 can further include a capacitive touch sensor 170 arranged across the top layer in of the substrate 110. In one implementation, the capacitive touch sensor 170 includes: an array of drive electrodes and sense electrodes arranged on the top layer in of the substrate 110; and a cover layer (e.g., a glass film) arranged over the substrate 110 to enclose the array of drive electrodes and sense electrodes and to form the touch sensor surface 116 (e.g., a "tactile surface") over the substrate 110.

In this implementation, the system 100 can include: a first quantity of electrode pairs 130 that form a first quantity of pressure sensors across the bottom layer 112 of the substrate 110; and a second quantity of drive electrodes and sense electrodes that form a second quantity of pixels—at least two orders of magnitude greater than the first quantity—in the capacitive touch sensor 170. For example the substrate 110 can define a rectangular geometry, and the capacitive touch sensor 170 and the touch sensor surface 116 can span a 90-millimeter by 120-millimeter sensible area over the substrate 110. In this example, the substrate 110 can define ten support locations 114 adjacent the perimeter of the rectangular geometry, including one support location 114 in each corner, one support location 114 centered along the short sides of the substrate 110, and two support locations 114 centered along the long sides of the substrate 110. In this example, the capacitive touch sensor 170 can include 60 drive electrode lines and 45 sense electrode lines for a total of 2,700 capacitive sensing pixels within the 90-millimeter by 120-millimeter sensible area over the substrate 110.

2.4 Spacers

As described above and shown in FIGS. 5 and 10, in this variation, the system 100 includes a set of spacers 140, wherein each spacer 140: is arranged over an electrode pair 130 at a support location 114 on the bottom layer 112 of the substrate 110; and includes a force-sensitive material exhibiting variations in local bulk resistance responsive to variations in applied force.

In one example shown in FIG. 7, the substrate 110 can: define a first support area spanning a circular area (e.g., a seven-millimeter-diameter area) on the bottom layer 112 of the substrate 110; and include a first pair of interdigitated electrodes fabricated on the bottom layer 112 of the substrate 110 within—and inset (e.g., by one millimeter) from—the perimeter of the first support location 114. In this example, a first spacer 140 can include a circular "coupon" of force-sensitive material: of size approximating the circular area of the first support location 114 (e.g., seven millimeters in diameter); and bonded (e.g., with a pressure-sensitive adhesive) to the bottom layer 112 of the substrate 110 between the first pair of interdigitated electrodes and the perimeter of the first support area. Furthermore, in this example, the first spacer 140 can include a vent port configured to vent air from a void between the first spacer 140 and the bottom layer 112 of the substrate 110 across the first support location 114, thereby enabling the spacer 140 to maintain contact with and span the first pair of interdigitated electrodes. Therefore, a resistance across the first pair of interdigitated electrodes may be representative of a magnitude of compression of the spacer 140, which may thus be interpreted as a force carried from the touch sensor surface 116, through the substrate 110 and the spacer 140, and into the chassis. The substrate 110 at the first support location 114, the first pair of interdigitated electrodes, and the first spacer 140 can thus cooperate to form a first discrete pressure sensor that exhibits changes in internal resistance as a function of force magnitude carried thereby.

In this example, additional pairs of interdigitated electrodes and spacers 140 can be similarly assembled to form additional discrete pressure sensors across the substrate 110, each of which exhibits changes in internal resistance as a function of force magnitude carried thereby.

However, each spacer 150 and electrode pair 130 can be of any other shape or geometry and assembled in any other way to form a discrete pressure sensor on the bottom layer 112 of the substrate 110.

2.5 Spring Elements and Chassis Interface

In this variation, the system 100 further includes an array of spring elements 150: coupled to the set of spacers 140 at the array of support locations 114; configured to support the substrate 110 on a chassis of a computing device; and configured to yield to displacement of the substrate 110 downward toward the chassis responsive to forces applied to the touch sensor surface 116.

In one implementation, the system 100 includes a chassis interface 190: configured to mount to the chassis of a computer system; and defining a set of spring elements 150 supported by each spacer 140 and configured to deflect out of the plane of the chassis interface 190 responsive to an input on the touch sensor surface 116.

In this implementation, the chassis of the computing device can include a chassis receptacle defining a depth approximating (or slightly more than) the thickness of the spacers 140 (e.g., 1.2-millimeter depth for 1.0-millimeter-thick spacers 140). The spacers 140 are bonded to the chassis interface 190 at each spring element 150. The chassis interface 190 can then be rigidly mounted to the chassis over the receptacle, such as via a set of threaded fasteners or an adhesive. The substrate 110 and the set of spacers 140 may thus transfer a force—applied to the touch sensor surface 116—into these spring elements 150, which deflect inwardly below a plane of the chassis interface 190 and into the chassis receptacle. Concurrently, each spacer 140 is compressed between the substrate 110 and the adjacent spring element 150 and therefore exhibits a change in its local bulk resistance proportional to the force carried by this adjacent spring element 150.

2.5.1 Manufacturing Defects

Generally, the array of spring elements 150 can: absorb manufacturing defects throughout the system 100, such as variations in thickness of the spacers 140, deviation from flatness of the substrate 110, and deviation from parallelism between the substrate 110 and the chassis, etc.; yield a repeatable baseline force at each pressure sensor over a range of ambient and operating conditions; and maintain a consistent load path from the spacers 140 into the chassis.

For example, the substrate 110, the set of spacers 140, and chassis receptacle may exhibit various manufacturing defects or geometric variations, such as non-planarity, non-parallelism, and thickness variations. Thus, loosening manufacturing tolerances and direct coupling between the substrate 110 and the chassis receptacle via the set of spacers 140 may result in tension across a first subset of these spacers 140 and compression across a second subset of these spacers 140. Because tension across a spacer 140 may separate the force-sensitive material from drive and sense electrode pairs 130 in a pressure sensor and/or because the force-sensitive material may not exhibit a measurable change in local bulk resistance when tensioned, a particular pressure sensor coupled to a particular spacer 140—in the first subset of spacers 140—may detect an infinite or high resistance: when no input (i.e., no additional force) is applied to the touch sensor surface 116; when an input is applied to the touch sensor surface 116 up to a force magnitude that transitions the particular spacer 140 from applying a tension across the particular pressure sensor to compressing the particular pressure sensor; and over a range of input force magnitudes therebetween. Therefore, in this example, the particular pressure sensor may exhibit no change in resistance or an inconsistent, non-repeatable, uninterpretable signal over this range of input force magnitudes, thereby reducing the dynamic range and sensitivity of the pressure sensor—and the system 100 more generally—at low input force magnitudes.

Furthermore, planarity, parallelism, and/or thickness, etc. of these elements in the system 100 may change as a function of temperature. Accordingly, tension and compression across these pressure sensors may change over time as a function of ambient temperature changes, ambient lighting changes, and operation of a computing device including the system 100, etc. such that the dynamic range and sensitivity of these pressure sensors may change non-linearly and unpredictably over time.

Therefore, the system 100 can include the chassis interface 190 that couples the spacers 140 to the chassis via a set of spring elements 150 that absorb manufacturing defects between the system 100 and the chassis and reduce tension on spacers 140 once assembled into the chassis, thereby increasing the dynamic range and sensitivity of each pressure sensor, such as for both inputs of small force magnitude on the touch sensor surface 116 and inputs of large force magnitude on the touch sensor surface that cause an opposite corner of the substrate 110 to lift from the chassis.

In particular, when the spacers 140 are bonded to corresponding spring elements 150 in the chassis interface 190 and when the chassis interface 190 is (subsequently) installed (e.g., fastened, clamped, bonded) over the chassis receptacle, a first subset of spring elements 150 coupled to the first subset of spacers 140 described above may deflect outwardly above the plane of the chassis interface 190, and a second subset of spring elements 150 coupled to the second subset of spacers 140 described above may deflect inwardly below the plane of the chassis interface 190, as shown in FIGS. 6 and 9, thereby reducing the maximum tensile and compressive forces across the first and second spacers 140 in a nominal state in which no force is applied to the touch sensor surface 116. (Additionally or alternatively, the first subset of spring elements 150 may deflect outwardly to absorb a gap between the plane of the chassis interface 190 and the first subset of spacers 140 in order to prevent separation of the force-sensitive material from drive and sense electrode pairs 130 in the first subset of pressure sensors in the nominal state, thereby enabling these pressure sensors to continue to output intelligible signals in the nominal state.)

Subsequently, when a force is applied to the touch sensor surface 116, the spring elements 150 may deflect downwardly, as shown in FIGS. 6 and 9, thereby enabling the substrate 110 and touch sensor surface 116 to move downwardly toward the chassis interface 190 while these spring elements 150 apply a resistive force to these spacers 140, which compresses the force-sensitive material against corresponding drive and sense electrode pairs 130 and produces a measurable change in resistance across some of these pressure sensors.

Furthermore, a particular spring element 150 may reduce tension between the a spacer 140 and the adjacent drive and sense electrode pairs 130 in the corresponding pressure sensor and/or prevents separation between the force-sensitive material and the drive and sense electrode pairs 130 in this pressure sensor. Therefore, a linear increase in applied force on the touch sensor surface 116 over the particular spring element 150 may yield a linear change in resistance value at the pressure sensor (e.g., linearly from a high resistance to a lower resistance).

In this variation, as planarity, parallelism, and/or thickness, etc. of elements in the system 100 change as a function of temperature and as positions of the spacers 140 change relative to the chassis due to these temperature-related changes, the spring elements 150 can absorb these positional changes of the spacers 140 relative to the chassis, thereby maintaining contact between the force-sensitive material and corresponding drive and sense electrode pairs 130 in these pressure sensors over a range of ambient and operating conditions.

Therefore, the system 100 can include the chassis interface 190 with the array of spring elements 150 configured to absorb positional differences between spacers 140 and the chassis, thereby enabling the system 100 to maintain a high dynamic range and high sensitivity, such as with loosened manufacturing tolerances and/or despite manufacturing defects.

2.5.2 Unitary Spring Elements and Chassis Interface Structure

In one implementation, the chassis interface 190 and spring elements 150 define a unitary structure (e.g., a "spring plate 152"). In one example, the chassis interface 190 includes a thin-walled structure (e.g., a stainless steel 20-gage, or 0.8-millimeter-thick sheet) that is punched, etched, or laser-cut to form a flexure aligned to each support location 114. Thus, in this example, each spring element 150 can define a flexure—such as a multi-arm spiral flexure—configured to laterally and longitudinally locate the system 100 over the chassis and configured to deflect inwardly and outwardly from a nominal plane defined by the thin-walled structure.

More specifically, in this example, the chassis interface 190 can include a unitary metallic sheet structure arranged between the substrate 110 and the chassis and defining a nominal plane. Each spring element 150: can be formed (e.g., fabricated) in the unitary metallic structure; can define a stage 154 coupled to a spacer 140 opposite the bottom layer 112 of the substrate 110; can include a flexure fabricated in the unitary metallic structure; and can be configured to return to approximately the nominal plane in response to absence of a touch input applied to the touch sensor surface 116.

2.5.3 Spring Element Locations

In one implementation, the substrate 110 defines a rectangular geometry with support locations 114 proximal the perimeter of this rectangular geometry. Accordingly, the spacers 140 and the array of spring elements 150 can cooperate to support the perimeter of the substrate 110 against the chassis of the computing device.

In this implementation, the substrate 110 and the cover layer—arranged over the capacitive touch sensor 170—can cooperate to form a semi-rigid structure that resists deflection between support locations 114. For example, with the perimeter of the substrate 110 supported by the array of spring elements 150, the substrate 110 and the cover layer can exhibit less than 0.3 millimeter of deflection out of a nominal plane when a force of ~1.6 Newtons (i.e., 165 grams, equal to an "click" input force threshold) is applied to the center of the touch sensor surface 116. The substrate 110 and the cover layer can therefore cooperate to communicate this applied force to the perimeter of the substrate 110 and thus into the spacers 140 and spring elements 150 below.

In this implementation, inclusion of a spring element 150 supporting the center of the substrate 110 may produce: a relatively high ratio of applied force to vertical displacement of the substrate 110 near both the center and the perimeter of the substrate 110; and a relatively low ratio of applied force to vertical displacement of the substrate 110 in an intermediate region around the center and inset from the perimeter of the substrate 110. Therefore, to avoid such non-linear changes in ratio of applied force to vertical displacement of the substrate 110—which may cause confusion or discomfort for a user interfacing with the system 100—the system 100 can: include spring elements 150 that support the perimeter of the substrate 110; exclude spring elements 150 supporting the substrate 110 proximal its center; and include a substrate 110 and a cover layer that form a substantially rigid structure.

More specifically, the array of spring elements 150 can support the perimeter of the substrate 110, and the substrate 110 and the cover layer can form a substantially rigid structure in order to achieve a ratio of applied force to vertical displacement of the substrate 110 that is approximately consistent or that changes linearly across the total area of the touch sensor surface 116.

2.5.4 Spring Force

Furthermore, in the foregoing implementation, the system 100 can include: a first subset of spring elements 150—characterized by a first spring constant—coupled to a first subset of support locations 114 proximal corners of the substrate 110; and a second subset of spring elements 150—characterized by a second spring constant less than the first spring constant—coupled to a second subset of support locations 114 proximal edges of the substrate 110.

In particular, in this implementation, the system 100 can include stiffer spring elements 150 that support corners of the substrate 110 and weaker spring elements 150 that support the remaining edges of the substrate 110 in order to achieve a consistent ratio of applied force to vertical displacement of the substrate 110 along the total perimeter of the substrate 110—including between an edge and a corner of the substrate 110. More specifically, the substrate 110 and the cover layer can: communicate a force applied near the center of the touch sensor surface 116 across all spring elements 150; communicate a force applied near an edge of a touch sensor surface 116 (predominantly) into a subset of spring elements 150 supporting this edge of the substrate 110; and communicate a force applied near a corner of the touch sensor surface 116 (predominantly) into one spring element 150 supporting this corner of the substrate 110. Therefore, spring elements 150 supporting corners of the substrate 110 can exhibit greater spring constants (e.g., less displacement per unit of applied force) than other spring elements 150 supporting the edges of the substrate 110.

2.5.5 Individual Spring Elements

In another implementation, the system 100 includes a set of discrete spring elements 150 arranged in (e.g., bonded to, press-fit into) individual spring receptacles in the chassis and coupled (e.g., bonded) to spacers 140 arranged across the bottom layer 112 of the substrate 110.

2.5.6 Preloaded Spring Elements

In this variation, the substrate 110 and spacers 140 can also be biased against the chassis interface 190 in order to preload the spring elements 150 and maintain at least a minimum compressive force between each spring element 150 and its corresponding pressure sensor, thereby: eliminating tension across each spring element 150 during operating; preventing separation of a spacer 140 from its corresponding electrode pair 130 on the substrate 110; ensuring that a bulk resistance of—and therefore a compressive force across—each spacer 140 remains sensible via its corresponding electrode pair 130 on the substrate 110; and increasing sensitivity of the system 100 to inputs of very small force magnitude (e.g., as low at one gram) on the touch sensor surface 116.

In one implementation shown in FIG. 9, the system 100 includes a membrane 198: applied over the top layer in of the substrate 110 (and over the array of drive electrodes and sense electrodes that form the capacitive touch sensor 170); defining the touch sensor surface 116; extending outwardly from the perimeter of the substrate 110; bonded, clamped, or otherwise retained by the chassis receptacle near a perimeter of the substrate 110; and tensioned across the substrate 110 to draw the substrate 110 downward, thereby compressing the array of spring elements 150 between the chassis and the set of spacers 140 and driving the set of spacers 140 into contact with their corresponding electrode pairs 130 on the bottom layer 112 of the substrate 110.

For example, the membrane 198 can include a silicone or PTFE (e.g., expanded PTFE) film bonded over the capacitive touch sensor 170 with an adhesive. Additionally or alternatively, the perimeter of the membrane 198 can be retained by the chassis across a plane below the capacitive touch sensor 170 such that tensioning the membrane 198 laterally within this plane imparts a downward force on the substrate 110 to drive the substrate 110 toward the chassis receptacle and thus compress the set of spring elements 150.

Furthermore, the chassis can define a flange (or "shelf," undercut) extending inwardly toward the lateral and longitudinal center of the receptacle. The outer section of the membrane 198 that extends beyond the substrate 110 can be inserted into the receptacle and brought into contact with the underside of the flange. A circumferential retaining bracket can then be fastened to the chassis under the flange and (fully) above the perimeter of the receptacle in order to clamp the membrane 198 between the chassis and the circumferential retaining bracket, thereby sealing the membrane 198 about the receptacle and tensioning the membrane 198 across the substrate 110.

Therefore, in this implementation, the system 100 can include a membrane 198: coupled to the chassis; and tensioned over the substrate 110 to a) preload compression of the set of spacers 140 between the substrate 110 and the array of spring elements 150; and approximately locate the set of spring elements 150 in a nominal plate—such as approximately in-line with the plane of the chassis interface 190—responsive to absence of a touch input on the touch sensor surface 116.

Additionally or alternatively, in one implementation, the membrane 198 includes a convolution between the perimeters of the substrate 110 and the receptacle. In this implementation, the convolution can be configured to deflect or deform in order to accommodate oscillation of the system 100 during a haptic feedback cycle, as described below. For example, the membrane 198 can include a polyimide film with a semi-circular ridge extending along a gap between the outer perimeter of the substrate 110 and the inner perimeter of the receptacle.

Furthermore, in this implementation, the system 100 can also include a glass or other cover layer bonded over the membrane 198 and extending up to a perimeter of the substrate 110.

2.6 Controller and Operation

In this variation of the system 100, the controller 180 is configured to, during a scan cycle: read a set of resistance values—from the array of electrode pairs 130—representing compression of the set of spacers 140 between the substrate 110 and the array of spring elements 150; and interpret a distribution of forces applied to the touch sensor surface 116 during this scan cycle based on the set of resistance values and force models representing spring constants of the array of spring elements 150.

In one example shown in FIG. 9, during a setup routine or during ongoing calibration cycles in which no touch input is applied to the touch sensor surface 116, the controller 180 can read resistance values from the pressure sensors and store these resistance values as baseline resistances—corresponding to absence of a touch input on the touch sensor surface 116—for these pressure sensors. Later, when a user depresses (e.g., with a stylus, a finger) a first region of the touch sensor surface 116 proximal a first spring element 150 at a first time, the first spring element 150 yields to this touch input. A first spacer 140, in the array of electrode pairs 130, thus: compresses between the first spring element 150 and a first support location 114—in the array of support locations 114—on the bottom layer 112 of the substrate 110; and exhibits a decrease in local bulk resistance proportional to a force magnitude of the touch input. Accordingly, the controller 180: reads a first resistance value from a first electrode pair 130—adjacent the first spacer 140—during a scan cycle spanning the first time; calculates a first change in resistance value across the first electrode pair 130 at the first time based on a difference between the first resistance value and a stored baseline resistance value for the first electrode pair 130; and interprets a portion of the force magnitude of the touch input carried by the first spring element 150 based on (e.g., proportional to) the first change in resistance value and a stored force model that relates deviation from baseline resistance to force carried by the first spring element 150 (e.g., based on a spring constant of the first spring element 150).

In this example, the controller 180 can implement this process for each other discrete pressure sensor on the substrate 110 in order to transform changes in resistance values detected at each pressure sensor into portions of the total force magnitude of the touch input carried by each spring element 150 at the first time. The controller 180 can then sum these portions to calculate the total force magnitude of the touch input during the first time. Additionally or alternatively, the controller 180 can fuse these portions of the force magnitude carried by each pressure sensor, the known positions of the pressure sensors on the substrate 110, and locations of multiple concurrent, discrete inputs detected on the touch sensor surface 116 via the capacitive touch sensor 170 in order to estimate the force applied by each discrete input, such as described below.

2.6.1 Negative Force

In one variation shown in FIG. 9, the controller 180 implements similar methods and techniques to detect both increases and decreases in forces carried by the discrete pressure sensors during a scan cycle based on decreases and increases in resistance, respectively, detected across these pressure sensors. More specifically, application of a force on the touch sensor surface 116 near a first corner of the touch sensor surface 116 may depress this first corner into the chassis but also cause a second, opposite corner of the substrate 110 to lift, thereby increasing the force carried by the first corner but reducing the force carried by the second corner. Therefore, the controller 180 can: detect both decreases and increases in resistance at the first and second pressure sensors in the first and second corners of the substrate 110; transform these resistances into positive and negative changes in force carried by the first and second pressure sensors; and sum these positive and negative changes in carried forces in order to calculate an accurate total force applied to the touch sensor surface 116 at this time.

For example and as described above, the system 100 can include a membrane 198 that preloads the array of spring elements 150 toward the chassis and that locates the spring elements 150 at a nominal plane—slightly below a top surface of the (thin sheet metal) chassis interface 190—when no touch input is applied to the touch sensor surface 116. Thus, each spring element 150 can: yield below the nominal plane in response to application of force on the touch sensor surface 116 proximal its corresponding support location 114; and yield above the nominal plane in response to application of force on the touch sensor surface 116 remote from its corresponding support location 114 (e.g., at an opposite edge of the touch sensor surface 116).

During a scan cycle, the controller 180 can read a first set of resistance values from a first subset of electrode pairs 130—in the array of electrode pairs 130—proximal a touch input on the touch sensor surface 116. Then, in response to the first set of resistance values deviating in a first direction from (e.g., falling below) the baseline resistance values stored for the first subset of electrode pairs 130, the controller 180 can interpret a first set of above-baseline (or "elevated," "positive") compressive forces carried by a first subset of spring elements 150 coupled to this first subset of electrode pairs 130.

Similarly, during this scan cycle, the controller 180 can: read a second set of resistance values from a second subset of electrode pairs 130—in the array of electrode pairs 130—remote from the touch input on the touch sensor surface 116. Then, in response to the second set of resistance values deviating in a second direction from (e.g., exceeding) the baseline resistance values stored for the second subset of electrode pairs 130, the controller 180 can interpret a second set of below-baseline (or "reduced," "negative") compressive forces carried by a second subset of spring elements 150 coupled to this second subset of electrode pairs 130.

The controller 180 can then interpret the total force magnitude of the touch input applied to the touch sensor surface 116 based on a combination of the first set of above-baseline compressive forces and the second set of below-baseline compressive forces. For example, the controller 180 can interpret the total force magnitude of the touch input applied to the touch sensor surface 116 during this scan cycle based on: a sum of the first set of above-baseline compressive forces; less a sum of the second set of below-baseline compressive forces.

2.6.2 Capacitive Touch+Resistive Force

Furthermore, in the variation of the system 100 described above that incudes an array of drive electrodes and sense electrodes that form a capacitive touch sensor 170 across the top layer in of the substrate 110, the controller 180 can: read capacitance values from the capacitive touch sensor 170 and resistance values from the set of pressure sensors during a scan cycle; and fuse these data into a location and force magnitude of a touch input on the touch sensor surface 116 during this scan cycle.

For example and as shown in FIG. 9, during a scan cycle, the controller 180 can: read a set of capacitance values (e.g., change in capacitance charge times, discharge times, or RC-circuit resonant frequencies) between drive electrodes and sense electrodes in the capacitive touch sensor 170; read a set of resistance values across electrode pairs 130 in the array of electrode pairs 130; detect a lateral position and a longitudinal position of a touch input on the touch sensor surface 116 based on the set of capacitance values (e.g., based on changes in capacitance values between drive electrodes and sense electrodes at known lateral and longitudinal positions across the top layer 111 of the substrate 110); interpret a force magnitude of the touch input based on the set of resistance values, as described above; and output the lateral position, the longitudinal position, and the force magnitude of the touch input, such as in the form of a force-annotated touch image.

Therefore, in this example, if the controller 180 detects a single touch input on the touch sensor surface 116 during this scan cycle based on the set of capacitance values, the controller 180 can attribute the entire applied force to this singular touch input. Accordingly, the controller 180 can: implement methods and techniques described above to calculate individual forces carried by each spring element 150 based on resistance values read from the adjacent electrode pairs 130, stored baseline resistance values for these electrode pairs 130, and stored force models for these springs elements; sum these individual forces to calculate a total force applied to the touch sensor surface 116 during this scan cycle; and label the location of the touch input—derived from the set of capacitance values—with this total force.

2.6.3 Multi-Touch

However, in this variation, if the controller 180 detects multiple touch inputs on the touch sensor surface 116 during a scan cycle based on a set of capacitance values read from the capacitive touch sensor 170, the controller 180 can fuse locations of discrete touch inputs derived from these capacitance values with force magnitudes carried by the spring elements 150 to estimate (e.g., disambiguate) force magnitude of these individual touch inputs.

Figure 10:
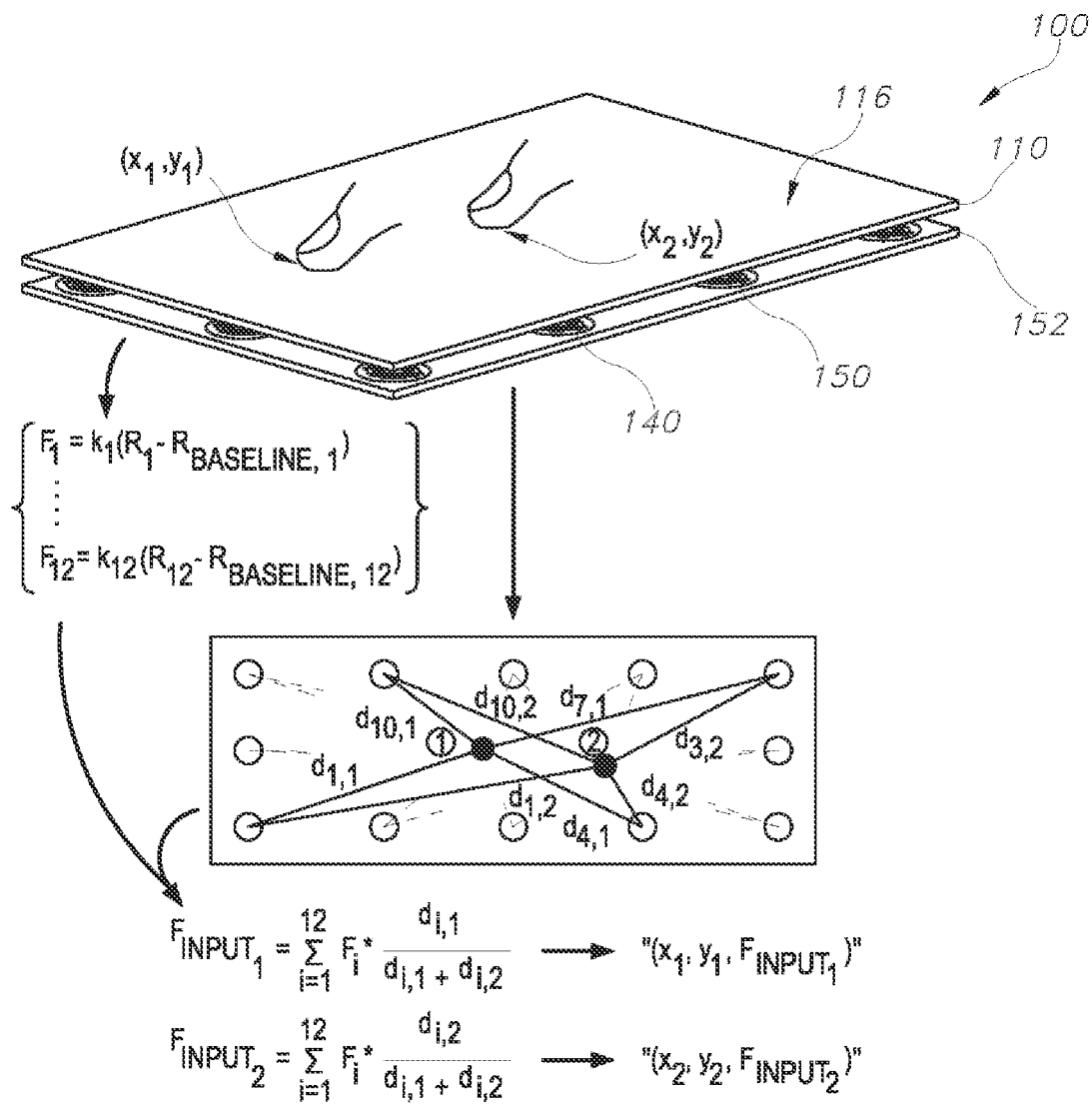
FIG. 10 is a flowchart representation of one variation of the system.

In one implementation shown in FIG. 10, during a scan cycle, the controller 180: reads a set of capacitance values between drive electrodes and sense electrodes in the capacitive touch sensor 170; reads a set of resistance values of electrode pairs 130 in the array of electrode pairs 130; detects a first lateral position and a first longitudinal position of a first touch input on the touch sensor surface 116 (e.g., a centroid of a first area on the touch sensor surface 116 identified as a first input) based on the set of capacitance values; and similarly detects a second lateral position and a second longitudinal position of a second touch input on the touch sensor surface 116 (e.g., a centroid of a second area on the touch sensor surface 116 identified as a second input) based on the set of capacitance values. For example, the controller 180 can implement blob detection, clustering or other touch interpretation techniques to distinguish the first and second inputs on the touch sensor surface 116, such as by isolating a) a first cluster of drive electrodes and sense electrodes exhibiting changes in capacitance values responsive to the first input from b) a second cluster of drive electrodes and sense electrodes exhibiting changes in capacitance values responsive to the second input.

In this example, the controller 180 can also implement methods and techniques described above to interpret a set of individual force magnitudes carried by each spring element 150 based on the set of resistance values, stored baseline resistance values of the corresponding electrode pairs 130, and stored spring element 150 models for the corresponding spring elements 150. Then, for each pressure sensor, the controller 180 can: calculate a first distance from the first touch input to the spring element 150 based on the first lateral position and the first longitudinal position of the first touch input; calculate a second distance from the second touch input to the spring element 150 based on the second lateral position and the second longitudinal position of the second touch input; estimate a first proportion of the individual force magnitude—carried by the spring element 150—that was applied by the first touch input based on a first ratio of the first distance to a combination (e.g., a sum) of the first distance and the second distance; and estimate a second proportion of the individual force magnitude that was applied by the second touch input based on a second ratio of the second distance to the combination (e.g., a sum) of the first distance and the second distance.

The controller 180 can then estimate a first total force magnitude applied by the first touch input based on a first combination (e.g., a sum) of force magnitudes carried by the array of springs, weighted by first proportions thus derived from the distances from these spring elements 150 to the first input. Similarly, the controller 180 can estimate a second total force magnitude applied by the second touch input based on a second combination (e.g., a sum) of force magnitudes carried by the array of springs, weighted by second proportions thus derived from the distances from these spring elements 150 to the second input.

Therefore, in this example, the controller 180 can estimate proportions of forces—carried by multiple springs elements—that proceed from multiple discrete touch inputs on the touch sensor surface 116 based on distances between these spring elements 150 and these discrete touch inputs. Additionally or alternatively, the controller 180 can estimate proportions of forces—carried by multiple spring elements 150—that proceed from multiple discrete touch inputs on the touch sensor surface 116 based on (e.g., proportional to) the sizes (e.g., areas, minimum widths) of these discrete touch inputs.

2.7 Haptic Feedback Module

In one variation shown in FIG. 5, the chassis interface 190 (or a separate spring plate 152 that locates the array of spring elements iso) defines a magnetic element receptacle 192 inset from the array of spring elements 150. In this variation, the system 100 can further include a magnetic element 194 (e.g., a Halbach array, a group of permanent magnets) arranged in (e.g., bonded to, potted within) the magnetic element receptacle 192. Furthermore, in this variation, the substrate 110 can include a conductive coil arranged over and configured to magnetically couple to the magnetic element 194 to form a vibrator. For example, the conductive coil can include a discrete air core wire inductor mounted (e.g., bonded, soldered) to the bottom layer 112 of the substrate 110. In another example, the substrate 110 includes multiple coaxial conductive spiral traces fabricated over multiple layers of the substrate 110 to form an integral fiberglass-core wire-trace inductor within the substrate 110.

Alternatively, the system 100 can include a discrete electromechanical vibrator mounted to the substrate 110 and selectively powered by the controller 180.

During operation, the controller 180 can drive the conductive coil or the electromechanical vibrator with an alternating current, thereby inducing an oscillating force between the conductive coil and the magnetic element 194, which oscillates the substrate 110 over the chassis and the chassis interface 190 and thus provides tactile (or "haptic") feedback to a user interfacing with the touch sensor surface 116 with a finger or stylus. For example, the controller 180 can drive the conductive coil with an alternating current during a click cycle in response to detecting application of a force in excess of a "click" input force threshold (e.g., 1.6 Newtons, 165 grams), as described above and below.

More specifically, during a scan cycle, the controller 180 can: read a set of resistance values from the array of electrode pairs 130; interpret a force magnitude of an input applied to the touch sensor surface 116 based on this set of resistance values; and drive an alternating current through the conductive coil to magnetically couple the conductive coil to the magnetic element 194 in response to the force magnitude of the input exceeding a threshold force magnitude (e.g., 1.6 Newtons, 165 grams). Accordingly, the array of spring elements 150 can yield to magnetic coupling between the conductive coil and the magnetic element 194 to enable the substrate 110 and the touch sensor surface 116 to oscillate relative to the chassis.

2.8.1 Substrate Motion

In one implementation, the vibrator can be configured to vibrate the substrate 110—relative to the chassis—in a vibration plane parallel to the touch sensor surface 116 and along a primary vibration axis (e.g., parallel to a short side of the touch sensor surface 116). Accordingly, each spring element 150 can be configured to preferentially deflect along the primary vibration axis and to resist deflection perpendicular to the primary vibration axis in response to a force in the vibration plane (e.g., response to actuation of the vibrator).

In one example, the conductive coil defines an inductor axis normal to the touch sensor surface 116; and the magnetic element 194 is arranged in the magnetic element receptacle 192 with a polar axis of the magnetic element 194 perpendicular to the inductor axis such that excitation of the conductive coil induces an oscillating force—between the conductive coil and the magnetic element 194—parallel to the touch sensor surface 116. In this example, each spring element 150 can include: a first set of flexure beams of a first length, of a first width, extending within the vibration plane, and extending perpendicular to the primary vibration axis; a second set of flexure beams of a second length less than the first length, of a second width greater than the first width, extending within the vibration plane, and/or extending parallel to the primary vibration axis; and a stage 154 (e.g., a "spacer 140 seat") suspended from a base of the chassis interface 190 via the first and second sets of flexure beams, as shown in FIGS. 8A-8C. Thus, in this example, the chassis interface 190 can be rigidly coupled to the chassis, and the set of spring elements 150 may exhibit less resistance to vibration along the primary vibration axis and may preferentially maintain the position of the system 100 orthogonal to the primary vibration axis while accommodating depression of the system 100 downward toward the chassis receptacle.

Alternatively, each spring element 150 can include a set of nested curvilinear beams that locate the spacer 140 seat relative to the base of the chassis interface 190 and that exhibit similar resistance to motion of the system 100 parallel and orthogonal to the primary vibration axis responsive to a force in the vibration plane, such as shown in FIGS. 8D-8F. In this implementation: the magnetic element 194 of the integrated vibrator can be arranged in the chassis receptacle; the chassis interface 190 can be elastically coupled to the chassis, such as via a set of rubber grommets, and can include a window over the magnetic element 194; and the coil can magnetically couple to the magnetic element 194—through the window—when activated to vibrate the system 100, including the chassis interface 190 and the touch sensor surface 116, along the primary vibration axis.

In another implementation, the conductive coil defines an inductor axis normal to the touch sensor surface 116; and the magnetic element 194 is arranged in the magnetic element receptacle 192 with the polar axis of the magnetic element 194 parallel to the inductor axis such that excitation of the conductive coil induces an oscillating force—between the conductive coil and the magnetic element 194—perpendicular to the touch sensor surface 116. In this implementation, the array of spring elements 150 can be configured to yield in a direction normal to the touch sensor surface 116 to enable the substrate 110 and the touch sensor surface 116 to oscillate vertically within the chassis. For example, in this implementation, each spring element 150 can include a spiral flexure supporting a stage 154 coupled (e.g., bonded) to a spacer 140 on the bottom layer 112 of the substrate 110.

Therefore, rather than rigid or low-compliancy coupling between the chassis and the array of spacers 140, the system 100 can include an array of spring elements 150 that yield to (e.g., elastically deform in response to) actuation of the vibrator during a click cycle, thereby limiting damping of vibration of the touch sensor surface 116 and enabling the system 100 to return perceptible haptic feedback to a user via a relatively small, low-voltage, and low-power vibrator.

Furthermore, in the variation of the system 100 that includes an integrated vibrator with a coil integrated into the substrate 110 and a separate magnetic element 194: the magnetic element 194 can be arranged in the chassis receptacle; the chassis interface 190 can include a window over the magnetic element 194, as shown in FIG. 7; and the coil can magnetically couple to the magnetic element 194—through the window—when activated to vibrate the system 100 along the primary vibration axis with the spring elements 150 elastically deforming along the primary vibration axis. Alternatively: the magnetic element 194 can be coupled directly to the chassis interface 190; and the coil can magnetically couple to the magnetic element 194 when activated to vibrate the system 100 along the primary vibration axis.

2.8 High-/Low-Resolution Regions

Figure 11:
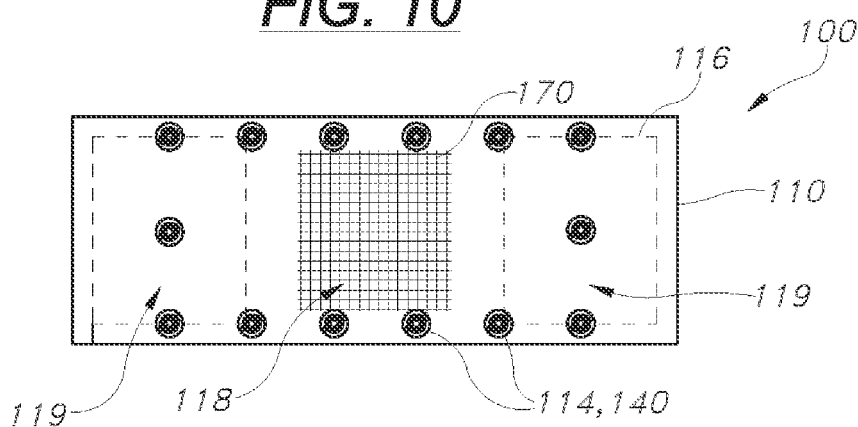
FIG. 11 is a schematic representation of one variation of the system.

In one variation shown in FIG. 11, the system 100 defines: a primary input region 118 supported by a set of pressure sensors and containing the capacitive touch sensor 170; and a secondary input region 119 supported by the set of pressure sensors but excluding a capacitive touch sensor 170.

2.8.1 Perimeter Pressure Sensors

In one implementation in which the system 100 is configured for installation as a touchpad arranged along a bottom edge of a keyboard in a laptop computer: the substrate 110 can approximately span the width of the keyboard; the capacitive touch sensor 170 can be approximately centered laterally over the substrate 110 to form the primary input region 118; and regions of the substrate 110 flanking the primary input region 118 can exclude capacitive touch sensors 170 and thus form two secondary input regions 119. In this implementation, the system 100 can include support regions, spacers 140, electrode pairs 130, and spring elements 150 arranged about the perimeter of the substrate 110 and that cooperate to support the entire substrate 110 on a chassis of the laptop computer. Thus, in this implementation, the substrate 110, the primary input region 118, and the secondary input regions 119 can "float" over the chassis and can be depressed toward the chassis, thereby: locally compressing (a subset of) spring elements 150; compressing (a subset of) spacers 140; decreasing resistance values across (a subset of) electrode pairs 130; and enabling the controller 180 to calculate both the total force applied across the primary and secondary regions and estimate force magnitudes of individual inputs applied across the primary and secondary regions.

2.8.2 Inset Pressure Sensors

In a similar implementation shown in FIG. 11, the system 100 includes support regions, spacers 140, electrode pairs 130, and spring elements 150 arranged: along the bottom edge of the primary input region 118; along the top edge of the primary input region 118; within the left secondary input region 119 inset from the left edge of the substrate 110; and within the right secondary input region 119 inset from the right edge of the substrate 110. Thus, in this implementation, the spring elements 150 can preferentially support the primary input region 118, and the controller 180 can preferentially interpret forces applied to the primary input region 118 based on changes in resistance across these electrode pairs 130. However, because the system 100 includes pressure sensors arranged under the secondary input regions 119, the controller 180 can also detect forces applied to the secondary input regions 119 based on changes in resistance values within these pressure sensors, such as a user's palms resting on the secondary input regions 119 while typing on the adjacent keyboard or while drawing a finger or stylus across the primary input region 118. However, in this implementation, because the system 100 excludes a capacitive touch sensor 170 over the secondary input regions 119, the controller 180 can: detect and track locations and force magnitudes of inputs over the primary input region 118; but detect force magnitudes only of inputs over the secondary input regions 119.

For example, the system 100 can include: a first subset of electrode pairs 130 occupying a first subset of support locations 114 within the first region of the substrate 110 (i.e., the primary input region 118); a second subset of electrode pairs 130 occupying a second subset of support locations 114 within the second region of the substrate 110 (i.e., the secondary input region 119); and an array of drive electrodes and sense electrodes—that form a capacitance touch sensor—are arranged over the first region of the substrate 110. In this example, the system 100 can also include: a first subset of spring elements 150 coupled to the first subset of support locations 114; and a second subset of spring elements 150 coupled to the second subset of support locations 114. Thus, during a scan cycle, the controller 180 can: read a subset of resistance values from the second subset of electrode pairs 130; and detect a palm in contact with the touch sensor surface 116 over the second region of the substrate 110 based on the subset of resistance values. More specifically, in this example, if the controller 180 detects absence of an input within the primary input region 118 via the capacitive touch sensor 170 but detects forces carried by the second subset of spring elements 150 based on changes in resistance values across the second subset of electrode pairs 130, the controller 180 can identify an input (e.g., a palm) —on the secondary input region 119—with a force magnitude equal to the sum of the forces carried by the spring elements 150.

Conversely, in this example, the controller 180 can detect: an input within the primary input region 118 via the capacitive touch sensor 170; forces carried by the first subset of spring elements 150 based on changes in resistance values across the first subset of electrode pairs 130; and forces carried by the second subset of spring elements 150 based on changes in resistance values across the second subset of electrode pairs 130. Accordingly, the controller 180 can: detect a first input (e.g., a finger, a stylus) on the primary input region 118; detect a second input (e.g., a finger, a stylus) on the secondary input region 119; interpret a first proportion of a force carried by a spring element 150 due to the first input based on a ratio of a first distance from support location 114 to the first input to a second distance from support location 114 to the center of the secondary input region 119; interpret a second proportion of a force carried by a spring element 150 due to the second input based on a ratio of a second distance from support location 114 to the center of the secondary input region 119 to a first distance from support location 114 to the first input; sum the first proportions to estimate the force magnitude of the first input on the primary input region 118; and sum the second proportions to estimate the force magnitude of the second input on the primary input region 118.

Then, in this example, the controller 180 (or the laptop computer) can activate (e.g., power, wake) the keyboard in response to detecting a palm on either secondary input region 119. Alternatively, the controller 180 can sample the keyboard at a lower sampling rate in response to detecting absence of a force applied to either secondary input region 119, which may indicate that no palm is present on the secondary input region 119 and that a user is not attempting to type on the keyboard; and vice versa.

In a similar implementation, the system 100 includes: a first, higher-resolution capacitive touch sensor 170 (e.g., a capacitive touch sensor 170 containing a first density of drive and second electrodes) arranged over the primary input region 118; and two lower-resolution capacitive touch sensors 170 (e.g., a capacitive touch sensor 170 containing a second density of drive and second electrodes less than the first density) arranged over the secondary input regions 119. In this implementation, the system 100 can also include: rows of pressure sensors and spring elements 150 supporting the top and bottom edges of the substrate 110 along the primary input region 118; and columns of pressure sensors and spring elements 150 supporting the secondary input region 119, such as near the junctions between the primary and secondary input regions 119 or proximal the centers of the secondary input regions 119. Thus, in this implementation, the controller 180 can: detect a location of a first input over the primary input region 118 with high resolution; detect a location of a second input over the secondary input region 119 with lower resolution; interpret forces carried by each spring element 150—supporting a known region of the substrate 110—based on changes in resistance values of the adjacent electrode pairs 130; implement methods and techniques similar to those described above to estimate portions of these forces applied by the first and second inputs; and then estimate the total force magnitudes of these inputs.

3. Force by Capacitance

Figure 12:
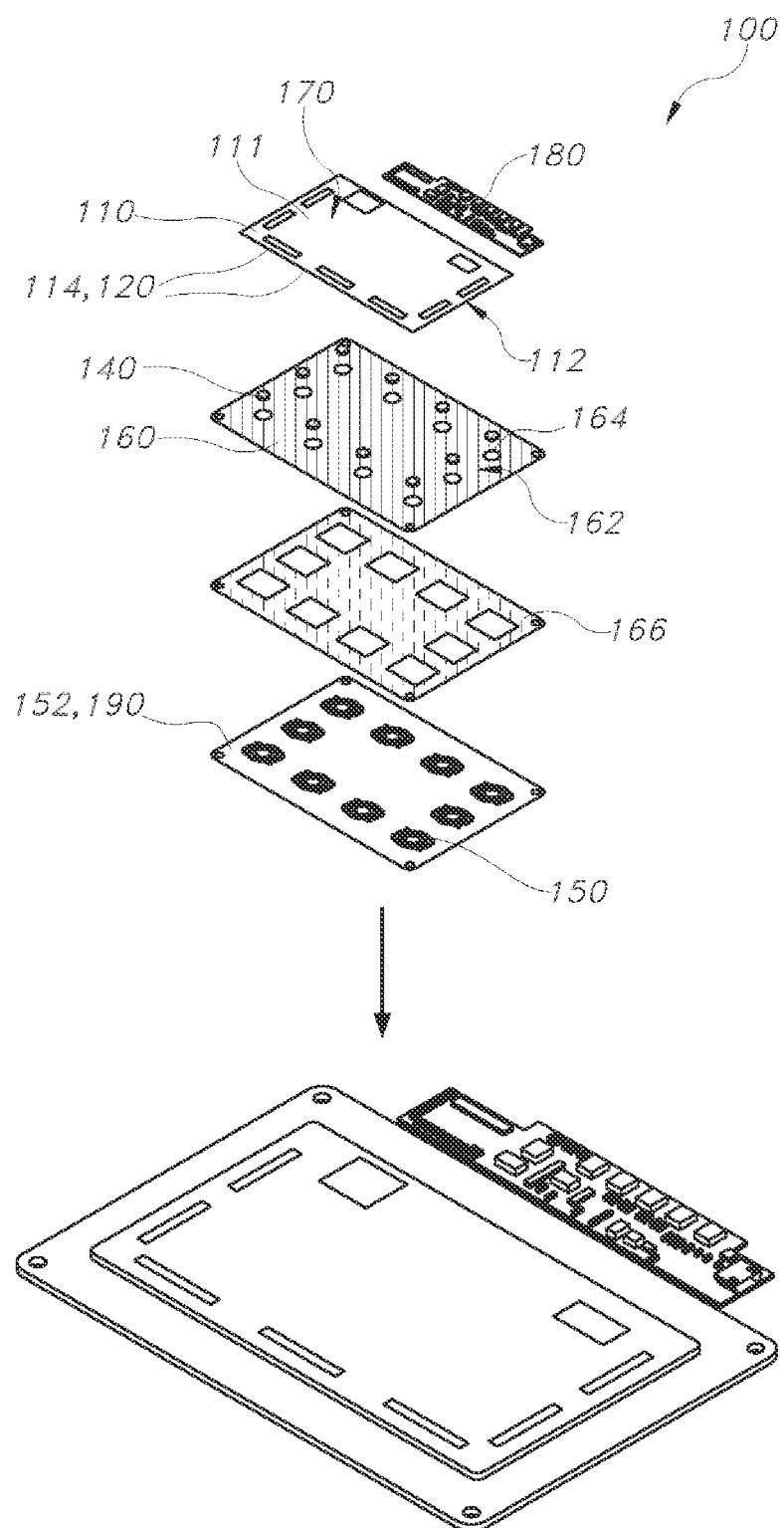
FIG. 12 is a schematic representation of one variation of the system.

Another variation of the system 100 shown in FIG. 12 includes: a substrate 110 including a top layer 111, a bottom layer 112, an array of capacitance sensors 120 arranged on the bottom layer 112, and an array of support locations 114 arranged on the bottom layer 112 adjacent the array of capacitance sensors 120; a touch sensor surface 116 arranged over the top layer in of the substrate 110; an array of spring elements 150 configured to couple the substrate 110 to a chassis and to yield to displacement of the substrate 110 downward toward the chassis responsive to forces applied to the touch sensor surface 116, each spring element 150 in the array of spring elements 150 coupled to the substrate 110 at a support location 114 in the array of support locations 114; a coupling plate 160 configured to couple to the chassis adjacent the array of spring elements 150 and effect capacitance values of the array of capacitance sensors 120 responsive to displacement of the substrate 110 toward the coupling plate 160; and a controller 180 configured to read capacitance values from the array of capacitance sensors 120 and interpret force magnitudes of inputs applied to the touch sensor surface 116 based on capacitance values read from the array of capacitance sensors 120.

Figure 14:
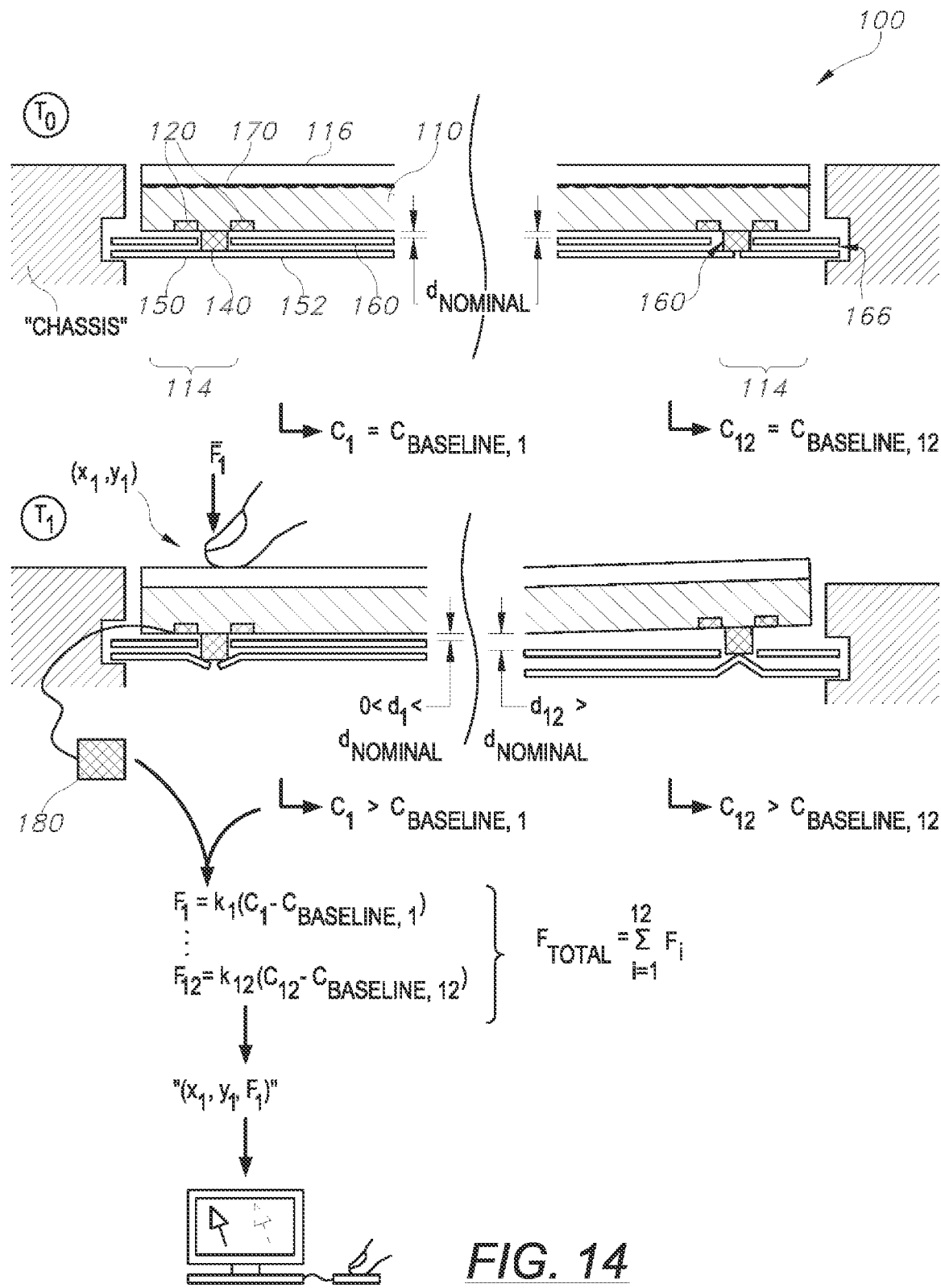
FIG. 14 is a flowchart representation of one variation of the system.

A similar variation of the system 100 shown in FIG. 14 includes: a substrate 110 including a top layer 111, a bottom layer 112, an array of capacitance sensors 120 arranged on the bottom layer 112, and an array of support locations 114 arranged on the bottom layer 112 adjacent the array of capacitance sensors 120; an array of drive electrodes and sense electrodes arranged on the top layer in of the substrate 110; a touch sensor surface 116 arranged over the array of drive electrodes and sense electrodes; an array of spring elements 150 configured to couple the substrate 110 to a chassis and to yield to displacement of the substrate 110 downward toward the chassis responsive to forces applied to the touch sensor surface 116, each spring element 150 in the array of spring elements 150 coupled to the substrate 110 at a support location 114 in the array of support locations 114; and a coupling plate 160 configured to couple to the chassis adjacent the array of spring elements 150 and effect capacitance values of the array of capacitance sensors 120 responsive to displacement of the substrate 110 toward the coupling plate 160. This variation of the system 100 further includes a controller 180 configured to, during a scan cycle: read a first set of capacitance values between drive electrodes and sense electrodes in the capacitive touch sensor 170; read a second set of capacitance values of capacitance sensors 120 in the array of capacitance sensors 120; detect a lateral position and a longitudinal position of a touch input on the touch sensor surface 116 based on the first set of capacitance values; interpret a force magnitude of the touch input based on the second set of capacitance values; and output the lateral position, the longitudinal position, and the force magnitude of the touch input.

3.1 Applications

Generally, in this variation, the system 100 includes: a coupling plate 160 mounted to the chassis of the computing device, facing and offset from the bottom layer 112 of the substrate 110, and extending near the array of spring elements 150; and an array of capacitance sensors 120 arranged across the bottom layer 112 of the substrate 110, configured to capacitively couple to the coupling plate 160, and thereby exhibiting changes in capacitance value (e.g., charge times, discharge times, or RC-circuit resonant frequencies) as a function of their distances from the coupling plate 160.

In this variation, the set of spring elements iso: vertically supports the substrate 110—proximal the array of capacitance sensors 120—against the chassis; and yields to a force applied to the touch sensor surface 116, thereby enabling nearby capacitance sensors 120 to move toward the coupling plate 160, which changes the capacitance values of these capacitance sensors 120 proportional to changes in distance between these capacitance sensors 120 and the coupling plate 160. The controller 180 can thus: calculate a change in distance between a capacitance sensor 120 and the coupling plate 160 based on a change in capacitance value of this capacitance sensor 120 from its stored baseline capacitance value; and calculate a force carried by the adjacent spring element 150 based on a stored spring constant of the spring element 150. The controller 180 can then implement methods and techniques described above: to calculate a total force applied to the touch sensor surface 116 based on forces carried by each spring element 150; and/or to fuse forces carried by each spring element 150 with input locations detected via the capacitive touch sensor 170 to estimate the force applied by individual touch inputs on the touch sensor surface 116.

3.2 Substrate

As described above, in this variation, the substrate 110 can include a fiberglass PCB including: a top layer 111; and a bottom layer 112 that defines an array of support locations 114. The substrate 110 further includes an array of capacitance sensors 120 arranged across the bottom layer 112 and adjacent (e.g., encircling, abutting) the support locations 114.

3.2.1 Mutual-Capacitance Sensors

Figure 13A:
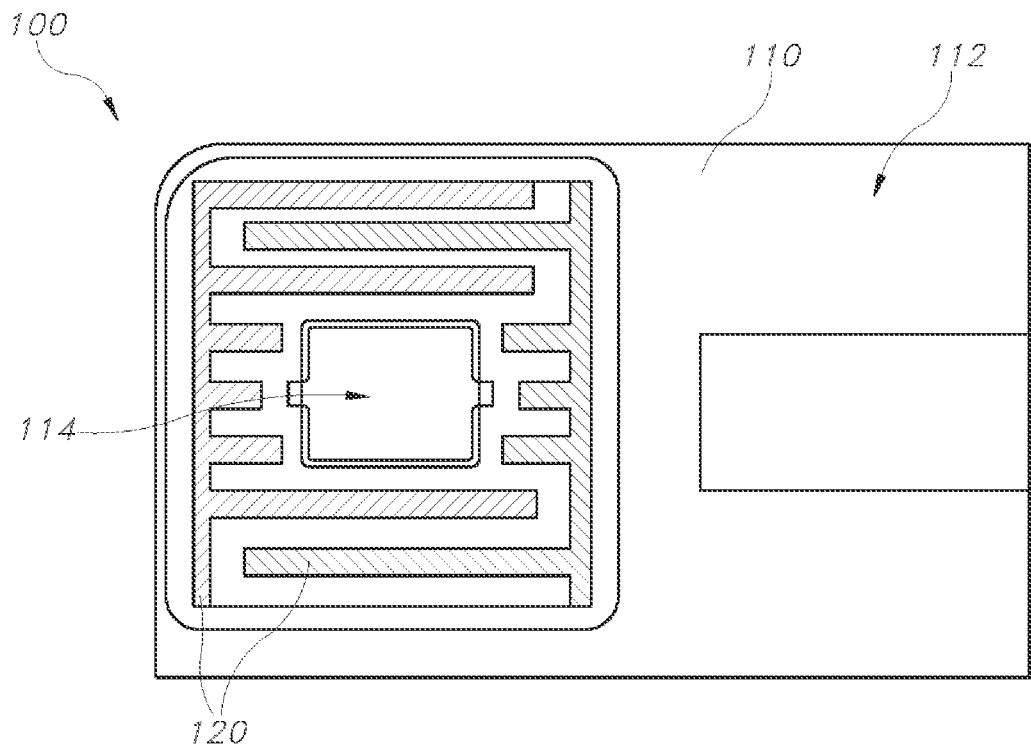
FIGS. 13A and 13B are schematic representations of variations of the system.

In one implementation shown in FIG. 13A, the capacitance sensors 120 are arranged in a mutual-capacitance configuration adjacent each support location 114.

For example, each capacitance sensor 120 can include: a drive electrode arranged on the bottom layer 112 of the substrate 110 adjacent a first side of a support location 114; and a sense electrode arranged on the bottom layer 112 of the substrate 110 adjacent a second side of the support location 114 opposite the drive electrode. In this example, the drive electrodes and sense electrodes within a capacitance sensor 120 can capacitively couple, and an air gap between the substrate 110 and the coupling plate 160 can form an air dielectric between the drive electrodes and sense electrodes. When the touch sensor surface 116 is depressed over a capacitance sensor 120, the adjacent spring element 150 can yield, thereby moving the drive electrodes and sense electrodes of the capacitance sensor 120 closer to the coupling plate 160 and reducing the air gap between these drive electrodes and sense electrodes. Because the coupling plate 160 exhibits a dielectric greater than air, the reduced distance between the coupling plate 160 and the substrate 110 thus increases the effective dielectric between the drive electrodes and sense electrodes and thus increases the capacitance of the drive electrodes and sense electrodes. The capacitance value of the capacitance sensor 120 may therefore deviate from a baseline capacitance value—such as in the form of an increase in the charge time of the capacitance sensor 120, an increase in the discharge time of the capacitance sensor 120, or a decrease in the resonant frequency of the capacitance sensor 120—when the touch sensor surface 116 is depressed over the capacitance sensor 120.

Therefore, in this implementation, the controller 180 can, during a scan cycle: drive the coupling plate 160 to a reference (e.g., ground) potential; (serially) drive each drive electrode in the capacitance sensors 120, such as a target voltage, over a target time interval, or with an alternating voltage of a particular frequency; read a set of capacitance values—from the sense electrodes in the array of capacitance sensors 120—that represent measures of mutual capacitances between drive electrodes and sense electrodes of these capacitance sensors 120; and interpret a distribution of forces applied to the touch sensor surface 116 based on this set of capacitance values and known spring constants of the array of spring elements 150, as described below.

3.2.2 Self-Capacitance Sensors

Figure 13B:
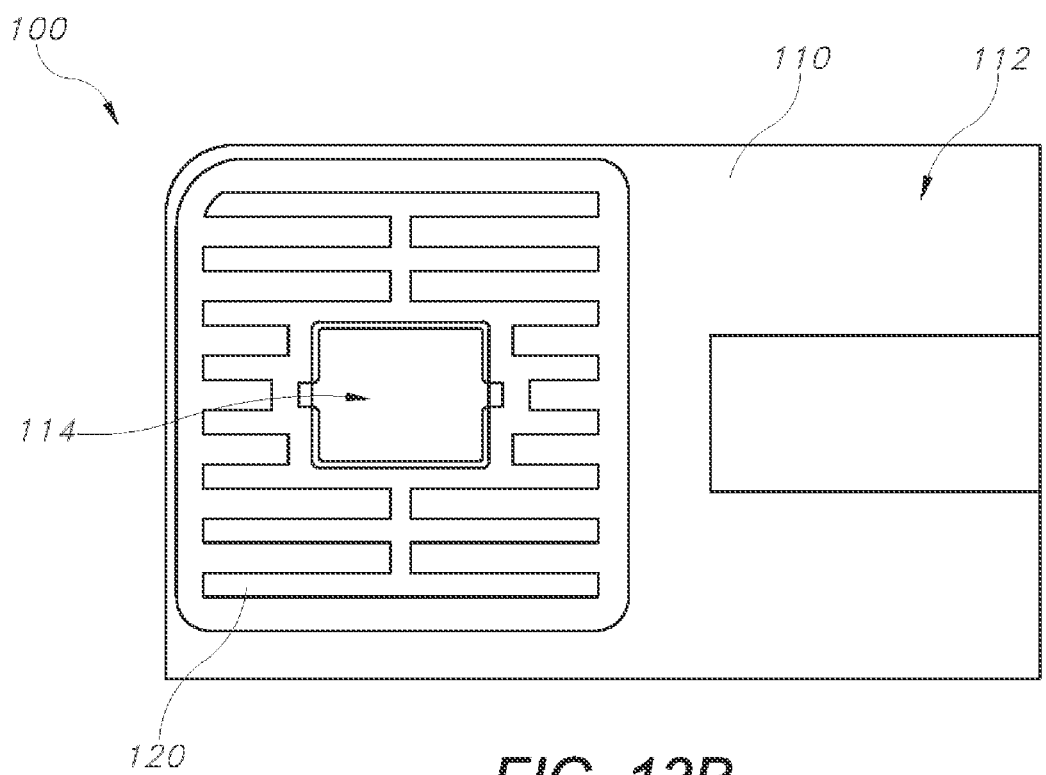

In another implementation shown in FIG. 13B, the capacitance sensors 120 are arranged in a self-capacitance configuration adjacent each support location 114.

For example, each capacitance sensor 120 can include a single electrode arranged on the bottom layer 112 of the substrate 110 adjacent (e.g., encircling) a support location 114, and the coupling plate 160 can function as a common second electrode for each capacitance sensor 120. In this example, the single electrode within a capacitance sensor 120 and the coupling plate 160 can capacitively couple, and an air gap between the substrate 110 and the coupling plate 160 can form an air dielectric between the capacitance sensor 120 and the coupling plate 160. When the touch sensor surface 116 is depressed over the capacitance sensor 120, the adjacent spring element 150 can yield, thereby: moving the capacitance sensor 120 closer to the coupling plate 160; reducing the air gap between the capacitance sensor 120 and the coupling plate 160; and increasing the capacitance between the capacitance sensor 120 and the coupling plate 160. The capacitance value of the capacitance sensor 120 may therefore deviate from a baseline capacitance value—such as in the form of an increase in the charge time of the capacitance sensor 120, an increase in the discharge time of the capacitance sensor 120, or a decrease in the resonant frequency of the capacitance sensor 120—when the touch sensor surface 116 is depressed over the capacitance sensor 120.

Therefore, in this implementation, the controller 180 can, during a scan cycle: drive the coupling plate 160 to a reference (e.g., ground) potential; (serially) drive each capacitance sensor 120, such as a target voltage, over a target time interval, or with an alternating voltage of a particular frequency; read a set of capacitance values—from the array of capacitance sensors 120—that represent measures of self capacitances between the capacitance sensors 120 and the coupling plate 160; and interpret a distribution of forces applied to the touch sensor surface 116 based on this set of capacitance values and known spring constants of the array of spring elements 150, as described below.

3.3 Capacitive Touch Sensor

As described above, in this variation, the system 100 can further include a capacitive touch sensor 170 arranged across the top layer in of the substrate 110. In one implementation, the capacitive touch sensor 170 includes: array of drive electrodes and sense electrodes arranged on the top layer in of the substrate 110; and a cover layer (e.g., a glass film) arranged over the substrate 110 to enclose the array of drive electrodes and sense electrodes and to form the touch sensor surface 116 (e.g., a "tactile surface") over the substrate 110.

In this implementation, the system 100 can include: a first quantity of capacitance sensors 120 that form a first quantity of pressure sensors across the bottom layer 112 of the substrate 110; and a second quantity of drive electrodes and sense electrodes that form a second quantity of pixels—at least two orders of magnitude greater than the first quantity—in the capacitive touch sensor 170, such as described above.

3.4 Spring Elements

In this variation, the system 100 further includes an array of spring elements 150: coupled (e.g., bonded, riveted, soldered) to the substrate 110 at the array of support locations 114; configured to support the substrate 110 on a chassis of a computing device; and configured to yield to displacement of the substrate 110 downward toward the chassis responsive to forces applied to the touch sensor surface 116.

3.4.1 Unitary Spring Elements and Chassis Interface Structure

In one implementation shown in FIG. 12, the system 100 includes a spring plate 152 that: includes a unitary structure that spans the bottom layer 112 of the substrate 110; and defines the array of spring elements 150 aligned to the support locations 114 on the substrate 110. In one example, similar to the chassis interface 190 described above, the spring plate 152 includes a thin-walled structure (e.g., a 20-gage, or 0.8-millimeter-thick stainless steel sheet) that is punched, etched, or laser-cut to form a flexure aligned to each support location 114. Thus, in this example, each spring element 150 can define a flexure—such as a multi-arm spiral flexure—configured to laterally and longitudinally locate the system 100 over the chassis and configured to deflect inwardly and outwardly from a nominal plane defined by the thin-walled plate.

More specifically, in this example, the spring plate 152 can include a unitary metallic sheet structure arranged between the substrate 110 and the chassis and defining a nominal plane. Each spring element 150: can be formed (e.g., fabricated) in the unitary metallic structure; can define a stage 154 coupled to a spacer 140 opposite the bottom layer 112 of the substrate 110; can include a flexure fabricated in the unitary metallic structure; and can be configured to return to approximate the nominal plane in response to absence of a touch input applied to the touch sensor surface 116.

3.4.2 Spring Element Locations

In one implementation, the substrate 110 defines a rectangular geometry with support locations 114 proximal the perimeter of this rectangular geometry. Accordingly, the array of spring elements 150 can cooperate to support the perimeter of the substrate 110 against the chassis of the computing device.

In this implementation, the substrate 110 and the cover layer—arranged over the capacitive touch sensor 170—can cooperate to form a semi-rigid structure that resists deflection between support locations 114. For example, with the perimeter of the substrate 110 supported by the array of spring elements 150, the substrate 110 and the cover layer can exhibit less than 0.3 millimeter of deflection out of a nominal plane when a force of ~1.6 Newtons (i.e., 165 grams, equal to an "click" input force threshold) is applied to the center of the touch sensor surface 116. The substrate 110 and the cover layer can therefore cooperate to communicate this applied force to the perimeter of the substrate 110 and thus into spring elements 150 below. As described above, the array of spring elements 150 can support the perimeter of the substrate 110, and the substrate 110 and the cover layer can form a substantially rigid structure in order to achieve a ratio of applied force to vertical displacement of the substrate 110 that is approximately consistent or that changes linearly across the total area of the touch sensor surface 116.

3.4.2 Spring Force

Furthermore, in the foregoing implementation, the system 100 can include: a first subset of spring elements 150—characterized by a first spring constant—coupled to a first subset of support locations 114 proximal corners of the substrate 110; and a second subset of spring elements 150—characterized by a second spring constant less than the first spring constant—coupled to a second subset of support locations 114 proximal edges of the substrate 110, as described above.

3.4.5 Individual Spring Elements

In another implementation, the system 100 includes a set of discrete spring elements 150 arranged in (e.g., bonded to, press-fit into) individual spring receptacles in the chassis and coupled (e.g., bonded) to the bottom layer 112 of the substrate 110 across the array of support locations 114.

3.4.6 Preloaded Spring Elements

As described above, the substrate 110 can also be biased against the spring plate 152 in order to: preload the spring elements 150; achieve a target nominal air gap between the capacitance sensors 120 and the coupling plate 160; achieve baseline capacitance values that fall within sensible ranges for each capacitance sensor 120; and thus enable the controller 180 to detect each capacitance sensor 120 moving both toward and away from the coupling plate 160 based on changes in its capacitance, such as responsive to a force applied to the touch sensor surface 116 over a capacitance sensor 120 and in response to a force applied to the touch sensor surface 116 remote from the capacitance sensor 120, respectively, as described below.

3.5 Coupling Plate

The coupling plate 160 is configured to: couple to the chassis adjacent the array of spring elements 150; and effect capacitance values of the array of capacitance sensors 120 responsive to displacement of the substrate 110 toward the coupling plate 160.

3.5.1 Separate Coupling Plate Between Spring Plate and Substrate

In one implementation shown in FIG. 12, the coupling plate 160 defines a discrete structure interposed between the spring plate 152 and the substrate 110 and rigidly mounted to the chassis of the computing device.

Generally, in this implementation, the coupling plate 160: can be interposed between the array of spring elements 150 and the substrate 110; can include an array of perforations 164 aligned (e.g., coaxial) with the array of support locations 114 and the array of spring elements 150 and defining geometries similar to (and slightly larger than) the stages 154 on the spring elements 150; and define an array of capacitive coupling regions 162 adjacent (e.g., encircling) the array of perforations 164. For example, the coupling plate 160 can include a thin-walled structure (e.g., a stainless steel 20-gage, or 0.8-millimeter-thick sheet) that is punched, etched, or laser-cut to form the array of perforations 164. In this implementation, each capacitance sensor 120 (e.g., drive electrodes and sense electrodes in the mutual capacitance configuration, a single electrode in the self capacitance configuration) can extend around a support location 114 on the bottom layer 112 of the substrate 110, such as up to a perimeter of the adjacent perforation 164 in the coupling plate 160 such that the capacitance sensor 120 (predominantly) capacitively couples to the adjacent capacitive coupling region 162 on the coupling plate 160 rather than the adjacent spring element 150.

Furthermore, in this implementation, the system 100 can further include a set of spacers 140, each of which: extends through a perforation 164 in the coupling plate 160; is (slightly) undersized for the perforation 164; and couples an adjacent support location 114 on the bottom layer 112 of the substrate 110 to an adjacent spring element 150 in the spring plate 152. For example, each spacer 140 can include a silicone coupon bonded (e.g., with a pressure-sensitive adhesive) to the stage 154 of an adjacent spring element 150 on one side and to the adjacent support location 114 on the substrate 110 on the opposing side.

Therefore, in this implementation, each capacitance sensor 120 can: capacitively couple to an adjacent capacitive coupling region 162 of the coupling plate 160; and move toward the adjacent capacitive coupling region 162 on the coupling plate 160 in response to application of a force on the touch sensor surface 116 proximal the capacitance sensor 120, which yields a change in the capacitance value of the capacitance sensor 120 representative of the portion of the force of this input carried the adjacent spring element 150. More specifically, because the coupling plate 160 is rigid and mechanically isolated from the substrate 110 and the spring elements 150, the capacitive coupling regions 162 of the coupling plate 160 can remain at consistent positions offset above the chassis receptacle such that application of a force to the touch sensor surface 116 compresses all or a subset of the spring elements 150, moves all or a subset of the capacitance sensors 120 closer to their corresponding capacitive coupling regions 162, and repeatably changes the capacitance values of these capacitance sensors 120 as a function of (e.g., proportional to) the force magnitudes carried by the spring elements 150, which the controller 180 can then interpret to accurately estimate these force magnitudes, the total force applied to the touch sensor surface 116, and/or force magnitudes of individual touch inputs applied to the touch sensor surface 116.

Furthermore, in this implementation, the spacer 140 can define a height approximating (or slightly greater than) a height of the maximum vertical compression of the adjacent spring element 150 corresponding to a target dynamic range of the adjacent capacitance sensor 120. For example, for a target dynamic range of 2 Newtons (e.g., 200 grams) for a pressure sensor given a maximum of one millimeter of vertical displacement of the touch sensor surface 116—and therefore a maximum of one millimeter of compression of the adjacent spring element 150—the spring element 150 can be tuned for a spring constant of 2000 Newtons per meter. Furthermore, the spacer 140 can be of a height of approximately one millimeter, plus the thickness of the coupling plate 160 and/or a stack tolerance (e.g., 10%, of 0.1 millimeter).

In this implementation, the coupling plate 160 and the spring plate 152 can be fastened directly to the chassis of the computing device. Alternatively, the coupling plate 160 and the spring plate 152 can be mounted (e.g., fastened, riveted, welded, crimped) to a separate chassis interface 190 that is then fastened or otherwise mounted to the chassis. The system 100 can also include a non-conductive buffer layer 166 arranged between the spring plate 152 and the coupling plate 160, as shown in FIG. 12, in order to electrically isolate the spring plate 152 from the coupling plate 160.

3.5.2 Integral Coupling Plate and Spring Plate

In another implementation, the coupling plate 160 and the spring plate 152 define a single unitary (e.g., metallic) structure arranged between the substrate 110 and the chassis.

Generally, in this implementation, the unitary metallic structure can define: a nominal plane between the chassis receptacle and the substrate 110; and an array of capacitive coupling regions 162 adjacent (e.g., aligned to, coaxial with) the array of support locations 114 on the substrate 110. In this implementation, each spring element 150: can be formed in the unitary metallic structure (e.g., by etching, laser cutting); can extend from its adjacent capacitive coupling region 162; can define a stage 154 coupled to the corresponding support location 114 on the bottom layer 112 of the substrate 110 (e.g., via a spacer 140 as described above); and can be configured to return to approximately the nominal plane in response to absence of a touch input applied to the touch sensor surface 116.

When the unitary structure is rigidly mounted to the chassis of the computing device, the unitary structure can thus rigidly locate the capacitive coupling regions 162 relative to the chassis and within (or parallel to) the nominal plane, and the stages 154 of the spring elements 150 can move vertically relative to the nominal plane and the capacitive coupling regions 162.

Thus, each capacitance sensor 120 on the substrate 110 can: capacitively couple to an adjacent capacitive coupling region 162 on the unitary metallic structure; and move toward this adjacent capacitive coupling region 162 in response to application of a force on the touch sensor surface 116 proximal the capacitance sensor 120, which thus changes the capacitance value of the capacitance sensor 120 proportional to compression of the adjacent spring element 150 and therefore proportional to the portion of the force carried by the spring element Iso.

Furthermore, in this implementation, the unitary metallic structure can be fastened directly to the chassis of the computing device. Alternatively, the unitary metallic structure can be mounted (e.g., fastened, riveted, welded, crimped) to a separate chassis interface 190 that is then fastened or otherwise mounted to the chassis.

3.6 Controller and Operation

In this variation of the system 100, the controller 180 is configured to, during a scan cycle: read a set of capacitance values—from the array of capacitance sensors 120—representing compression of the array of spring elements 150 between the chassis and the substrate 110; and interpret a distribution of forces applied to the touch sensor surface 116 during the scan cycle based on this set of capacitance values and force models representing spring constants of the array of spring elements 150.

In one example shown in FIG. 14, during a setup routine or during ongoing calibration cycles in which no touch input is applied to the touch sensor surface 116, the controller 180 can read capacitance values from the pressure sensors and store these capacitance values as baseline capacitances—corresponding to absence of a touch input on the touch sensor surface 116—for these pressure sensors. Later, when a user depresses (e.g., with a stylus, a finger) a first region of the touch sensor surface 116 proximal a first spring element 150 at a first time: the first spring element 150 yields to this touch input; and a first capacitance sensor 120, adjacent the first region of the touch sensor surface 116, thus advances toward a first capacitive coupling region 162 on the coupling plate 160 by a distance proportional to a force magnitude of the touch input. Accordingly, the controller 180: reads a first capacitance value from the first capacitance sensor 120 during a scan cycle spanning the first time; calculates a first change in capacitance at the first capacitance sensor 120 at the first time based on a difference between the first capacitance value and a stored baseline capacitance value for the first capacitance sensor 120; and interprets a portion of the force magnitude of the touch input carried by the first spring element 150 based on (e.g., proportional to) the first change in capacitance value and a stored force model that relates deviation from baseline capacitance to force carried by the first spring element 150 (e.g., based on a spring constant of the first spring element 150).

In this example, the controller 180 can implement this process for each other discrete pressure sensor on the substrate 110 in order to transform changes in capacitance values detected at each pressure sensor into portions of the total force magnitude of the touch input carried by each spring element 150 at the first time. The controller 180 can then sum these portions to calculate the total force magnitude of the touch input during the first time. Additionally or alternatively, the controller 180 can fuse these portions of the force magnitude carried by each pressure sensor, the known positions of the pressure sensors on the substrate 110, and locations of multiple concurrent, discrete inputs detected on the touch sensor surface 116 via the capacitive touch sensor 170 in order to estimate the force applied by each discrete input, such as described below.

3.6.1 Negative Force

In one variation shown in FIG. 14, the controller 180 implements similar methods and techniques to detect both increases and decreases in forces carried by the discrete pressure sensors during a scan cycle based on decreases and increases in capacitance, respectively, detected across these pressure sensors. More specifically, application of a force on the touch sensor surface 116 near a first corner of the touch sensor surface 116 may depress this first corner into the chassis but also cause a second, opposite corner of the substrate 110 to lift, thereby increasing the force carried by the first corner but reducing the force carried by the second corner. Therefore, the controller 180 can: detect both increases and decreases in capacitance at the first and second pressure sensors in the first and second corners of the substrate 110; interpret positive and negative changes in force carried by the first and second pressure sensors from these increases and decreases in capacitance at the first and second pressure sensors; and sum these positive and negative changes in carried forces in order to calculate an accurate total force applied to the touch sensor surface 116 at this time.

For example, during a scan cycle, the controller 180 can read a first set of capacitance values from a first subset of capacitance sensors 120—in the array of capacitance sensors 120—proximal a touch input on the touch sensor surface 116. Then, in response to the first set of capacitance values deviating in a first direction from the baseline capacitance values stored for the first subset of capacitance sensors 120, the controller 180 can interpret a first set of elevated compressive forces carried by a first subset of spring elements 150 coupled to this first subset of capacitance sensors 120. For example, the controller 180 can interpret a first set of elevated compressive forces carried by the first subset of spring elements 150 in response to their measured capacitances exceeding corresponding baseline capacitance, their measured (dis)charge times falling below corresponding baseline (dis)charge times, and/or their measured resonant frequencies falling below corresponding baseline resonant frequencies.

Similarly, during this scan cycle, the controller 180 can: read a second set of capacitance values from a second subset of capacitance sensors 120—in the array of capacitance sensors 120—remote from the touch input on the touch sensor surface 116. Then, in response to the second set of capacitance values deviating in a second direction from the baseline capacitance values stored for the second subset of capacitance sensors 120, the controller 180 can interpret a second set of tensile forces carried by a second subset of spring elements 150 coupled to this second subset of capacitance sensors 120. For example, the controller 180 can interpret a second set of tensile forces carried by the second subset of spring elements 150 in response to their measured capacitances falling below corresponding baseline capacitance, their measured (dis)charge times exceeding corresponding baseline (dis)charge times, and/or their measured resonant frequencies exceeding corresponding baseline resonant frequencies.

The controller 180 can then interpret the total force magnitude of the touch input applied to the touch sensor surface 116 based on a combination of the first set of elevated compressive forces and the second set of tensile forces. For example, the controller 180 can interpret the total force magnitude of the touch input applied to the touch sensor surface 116 during this scan cycle based on: a sum of the first set of elevated compressive forces; less a sum of the second set of tensile forces.

3.6.2 Capacitive Touch+Resistive Force

Furthermore, in the variation of the system 100 described above that incudes an array of drive electrodes and sense electrodes that form a capacitive touch sensor 170 across the top layer in of the substrate 110, the controller 180 can: read capacitance values from the capacitive touch sensor 170 and capacitance values from the set of pressure sensors during a scan cycle; and fuse these data into a location and force magnitude of a touch input on the touch sensor surface 116 during this scan cycle.

In one implementation, the controller 180 can read all capacitance sensors 120 in the capacitive touch sensor 170 and the pressure sensors in a single series during one scan cycle. More specifically, in the mutual capacitance configuration described above, drive electrode columns and sense electrode rows in the capacitive touch sensor 170 can be coupled to drive and sense channels on the controller 180; the electrodes in the pressure sensors can be similarly coupled to these same or other drive and sense channels in the controller 180. For example, during a scan cycle, the controller 180 can: serially read a first set of capacitance values from the array of drive electrodes and sense electrodes in the capacitive touch sensor 170 over a first segment of the scan cycle; seamlessly transition to serially reading a second set of capacitance values from the array of capacitance sensors 120 over a second segment of the scan cycle succeeding (or preceding) the first segment of the scan cycle. The controller 180 (or a power supply in or connected to the system 100) can also drive the coupling plate 160 to a reference potential during (at least) the second segment of the scan cycle.

Conversely, in the self capacitance configuration described above, drive electrode columns and sense electrode rows in the capacitive touch sensor 170 can be coupled to drive and sense channels on the controller 180; the singular electrodes in the pressure sensors can be similarly coupled to sense channels in the controller 180. For example, during a scan cycle, the controller 180 can: serially read a first set of capacitance values from the array of drive electrodes and sense electrodes in the capacitive touch sensor 170 over a first segment of the scan cycle; and seamlessly transition to serially reading a second set of capacitance values from the array of capacitance sensors 120 over a second segment of the scan cycle succeeding (or preceding) the first segment of the scan cycle. The controller 180 (or a power supply in or connected to the system 100) can also drive the coupling plate 160 to a reference potential during (at least) the second segment of the scan cycle.

Therefore, during a scan cycle, the controller 180 can: read a first set of capacitance values (e.g., change in capacitance charge times, discharge times, or RC-circuit resonant frequencies) between drive electrodes and sense electrodes in the capacitive touch sensor 170; and read a second set of capacitance values across capacitance sensors 120 on the bottom layer 112 of the substrate 110. The controller 180 can then: detect a lateral position and a longitudinal position of a touch input on the touch sensor surface 116 based on the first set of capacitance values (e.g., based on changes in capacitance values between drive and sensor electrode pairs 130 at known lateral and longitudinal positions across the top layer in of the substrate 110); interpret a force magnitude of the touch input based on the second set of capacitance values, as described above; and output the lateral position, the longitudinal position, and the force magnitude of the touch input, such as in the form of a force-annotated touch image.

In this example, if the controller 180 detects a single touch input on the touch sensor surface 116 during this scan cycle based on the first set of capacitance values, the controller 180 can attribute the entire applied force to this singular touch input. Accordingly, the controller 180 can: implement methods and techniques described above to calculate individual forces carried by each spring element 150 based on capacitance values read from the adjacent capacitance sensors 120, stored baseline capacitance values for these capacitance sensors 120, and stored force models for these springs elements; sum these individual forces to calculate a total force applied to the touch sensor surface 116 during this scan cycle; and label the location of the touch input—derived from the set of capacitance values—with this total force.

3.6.2 Multi-Touch

However, in this variation, if the controller 180 detects multiple touch inputs on the touch sensor surface 116 during a scan cycle based on the first set of capacitance values read from the capacitive touch sensor 170, the controller 180 can fuse locations of discrete touch inputs derived from these capacitance values with force magnitudes carried by the spring elements 150 to estimate (e.g., disambiguate) force magnitude of these individual touch inputs.

In one implementation, during a scan cycle, the controller 180: reads a first set of capacitance values between drive electrodes and sense electrodes in the capacitive touch sensor 170; reads a second set of capacitance values from capacitance sensors 120 on the bottom layer 112 of the substrate 110; detects a first lateral position and a first longitudinal position of a first touch input on the touch sensor surface 116 (e.g., a centroid of a first area on the touch sensor surface 116 identified as a first input) based on the first set of capacitance values; and similarly detects a second lateral position and a second longitudinal position of a second touch input on the touch sensor surface 116 (e.g., a centroid of a second area on the touch sensor surface 116 identified as a second input) based on the first set of capacitance values. For example, the controller 180 can implement blob detection, clustering, or other touch interpretation techniques to distinguish the first and second inputs on the touch sensor surface 116, such as by isolating a) a first cluster of drive electrodes and sense electrodes exhibiting changes in capacitance values responsive to the first input from b) a second cluster of drive electrodes and sense electrodes exhibiting changes in capacitance values responsive to the second input.

In this example, the controller 180 can also implement methods and techniques described above to interpret a set of individual force magnitudes carried by each spring element 150 based on the second set of capacitance values, stored baseline capacitance values of the corresponding capacitance sensors 120, and stored spring element 150 models for the corresponding spring elements 150. Then, for each pressure sensor, the controller 180 can: calculate a first distance from the first touch input to the spring element 150 based on the first lateral position and the first longitudinal position of the first touch input; calculate a second distance from the second touch input to the spring element 150 based on the second lateral position and the second longitudinal position of the second touch input; estimate a first proportion of the individual force magnitude—carried by the spring element 150—that was applied by the first touch input based on a first ratio of the first distance to a combination (e.g., a sum) of the first distance and the second distance; and estimate second proportion of the individual force magnitude that was applied by the second touch input based on a second ratio of the second distance to the combination (e.g., a sum) of the first distance and the second distance.

The controller 180 can then estimate a first total force magnitude applied by the first touch input based on a first combination (e.g., a sum) of force magnitudes carried by the array of springs, weighted by first proportions thus derived from the distances from these spring elements 150 to the first input. Similarly, the controller 180 can estimate a second total force magnitude applied by the second touch input based on a second combination (e.g., a sum) of force magnitudes carried by the array of springs, weighted by second proportions thus derived from the distances from these spring elements 150 to the second input.

Therefore, in this example, the controller 180 can estimate proportions of forces—carried by multiple spring elements—that proceed from multiple discrete touch inputs on the touch sensor surface 116 based on distances between these spring elements 150 and these discrete touch inputs. Additionally or alternatively, the controller 180 can estimate proportions of forces—carried by multiple springs elements—that proceed from multiple discrete touch inputs on the touch sensor surface 116 based on (e.g., proportional to) the sizes (e.g., areas, minimum widths) of these discrete touch inputs.

3.7 Haptic Feedback Module

As described above, in this variation, the spring plate 152 and/or the coupling plate 160 can also define a magnetic element receptacle 192 inset from the array of spring elements 150. In this variation, the system 100 can further include a magnetic element 194 (e.g., a Halbach array, a group of permanent magnets) arranged in (e.g., bonded to, potted within) the magnetic element receptacle 192. Furthermore, in this variation, the substrate 110 can include a conductive coil arranged over and configured to magnetically couple to the magnetic element 194 to form a vibrator. For example, the conductive coil can include a discrete air core wire inductor mounted (e.g., bonded, soldered) to the bottom layer 112 of the substrate 110. In another example, the substrate 110 includes multiple coaxial conductive spiral traces fabricated over multiple layers of the substrate 110 to form an integral fiberglass-core wire-trace inductor within the substrate 110.

Alternatively, the system 100 can include a discrete electromechanical vibrator mounted to the substrate 110 and selectively powered by the controller 180.

The system and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:
1. A system for detecting inputs at a computing device comprising:
    a substrate comprising:
        a first sense electrode arranged on the substrate; and
        a first support location arranged adjacent the first sense electrode;
    a touch sensor surface arranged over the substrate;
    a first spring element coupled to the substrate at the first support location and configured to couple the substrate to a chassis and to yield to displacement of the substrate downward toward the chassis responsive to forces applied to the touch sensor surface;
    a coupling layer defining a first coupling region and arranged below the substrate, the first coupling region adjacent the first support location and configured to effect electrical values of the first sense electrode responsive to displacement of the substrate toward the coupling layer; and
    a controller configured to:
        read electrical values from the first sense electrode; and
        interpret force magnitudes of inputs applied to the touch sensor surface based on the electrical values read from the first sense electrode.
2. The system of claim 1:
    further comprising:
        a first set of drive and sense electrode pairs comprising the first sense electrode and arranged on a bottom layer of the substrate; and
        a second set of drive and sense electrode pairs arranged on a top layer of the substrate;
    wherein the touch sensor surface is arranged over the second set of drive and sense electrode pairs; and
    wherein the controller is configured to, during a scan cycle:
        read a first set of capacitance values between drive electrodes and sense electrodes in the first set of drive and sense electrode pairs;
        read a second set of capacitance values between drive electrodes and sense electrodes in the second set of drive and sense electrode pairs;
        detect a lateral position and a longitudinal position of a touch input on the touch sensor surface based on the second set of capacitance values;
        interpret a force magnitude of the touch input based on the first set of capacitance values; and
        output the lateral position, the longitudinal position, and the force magnitude.
3. The system of claim 2, wherein the controller is configured to, during the scan cycle:
    access a force model representing a relationship between deviation from a baseline capacitance value and force carried by the first spring element based on a spring constant of the first spring element; and
    interpret the force magnitude of the touch input based on the first set of capacitance values and the force model.
4. The system of claim 2:
    wherein the first set of drive and sense electrode pairs defines a first quantity of capacitance sensors; and
    wherein the second set of drive and sense electrode pairs comprises a second quantity of drive electrode and sense electrode pairs, the second quantity at least two orders of magnitude greater than the first quantity.
5. The system of claim 2:
    wherein the coupling layer comprises a coupling plate defining a set of coupling regions comprising the first coupling region; and
    wherein the controller is configured to:
        serially read the second set of capacitance values from the second set of drive and sense electrode pairs over a second segment of the scan cycle;
        serially read the first set of capacitance values from the first set of drive and sense electrode pairs over a first segment of the scan cycle succeeding the second segment of the scan cycle; and
        drive the coupling plate to a reference potential during the first segment of the scan cycle.
6. The system of claim 2:
    wherein the first set of drive and sense electrode pairs defines:
        a first subset of capacitance sensors adjacent a first subset of support locations, in a set of support locations, within a first region of the substrate; and a second subset of capacitance sensors adjacent a second subset of support locations, in the set of support locations, within a second region of the substrate;

wherein the second set of drive and sense electrode pairs are arranged over the first region of the substrate;

further comprising a set of spring elements comprising:
the first spring element;
a first subset of spring elements coupled to the first subset of support locations; and
a second subset of spring elements coupled to the second subset of support locations; and wherein the controller is configured to, during the scan cycle:
read a subset of capacitance values from the second subset of capacitance sensors; and
detect a palm in contact with the touch sensor surface over the second region of the substrate based on the subset of capacitance values.

7. The system of claim 1:
further comprising:
a first set of drive and sense electrode pairs comprising the first sense electrode and arranged on a bottom layer of the substrate; and
a second set of drive and sense electrode pairs arranged on a top layer of the substrate;
further comprising a set of spring elements comprising the first spring element, each spring element in the set of spring elements:
coupled to a support location, in a set of support locations, on the bottom layer of the substrate;
configured to yield below a nominal plane in response to application of force on the touch sensor surface proximal the support location; and
configured to yield above the nominal plane in response to application of force on the touch sensor surface remote from the support location; and
wherein the controller is configured to, during a scan cycle:
read a first set of capacitance values from a first subset of capacitance sensors, in the first set of drive and sense electrode pairs, proximal a touch input on the touch sensor surface;
in response to the first set of capacitance values deviating in a first direction from baseline capacitance values for the first subset of capacitance sensors, interpret a first set of compressive forces carried by the first subset of spring elements, in the set of spring elements, proximal the first subset of capacitance sensors;
read a second set of capacitance values from a second subset of capacitance sensors, in the first set of drive and sense electrode pairs, remote from the touch input on the touch sensor surface;
in response to the second set of capacitance values deviating in a second direction from baseline capacitance values for the second subset of capacitance sensors, interpret a second set of tensile forces carried by a second subset of spring elements, in the set of spring elements, remote from the second subset of capacitance sensors; and
interpret a force magnitude of the touch input applied to the touch sensor surface based on a combination of the first set of compressive forces and the second set of tensile forces.

8. The system of claim 1:
further comprising a first set of sense electrodes comprising the first sense electrode, each sense electrode in the first set of sense electrodes encircling a support location, in a set of support locations, on a bottom layer of the substrate;
wherein the coupling layer defines a set of coupling regions comprising the first coupling region, each coupling region in the set of coupling regions adjacent a support location in the set of support locations; and
wherein the controller is configured to, during a scan cycle:
read a set of capacitance values, from the first set of sense electrodes, representing measures of self-capacitance between the first set of sense electrodes and the set of coupling regions; and
interpret a distribution of forces applied to the touch sensor surface based on the set of capacitance values and spring constants of a set of spring elements arranged below the substrate.

9. The system of claim 1:
further comprising:
a first set of drive and sense electrode pairs comprising the first sense electrode and arranged on a bottom layer of the substrate; and
a second set of drive and sense electrode pairs arranged on a top layer of the substrate; and
wherein the controller is configured to, during a scan cycle:
read a first set of capacitance values from the first set of drive and sense electrode pairs;
read a second set of capacitance values from the second set of drive and sense electrode pairs;
detect a first lateral position and a first longitudinal position of a first touch input on the touch sensor surface based on the second set of capacitance values;
detect a second lateral position and a second longitudinal position of a second touch input on the touch sensor surface based on the second set of capacitance values;
interpret a set of force magnitudes carried by a set of spring elements based on the first set of capacitance values;
estimate a first force magnitude of the first touch input based on:
the first lateral position and the first longitudinal position of the first touch input;
the set of force magnitudes carried by the set of spring elements; and
locations of spring elements, in the set of spring elements, coupled to the substrate;
estimate a second force magnitude of the second touch input based on:
the second lateral position and the second longitudinal position of the second touch input;
the set of force magnitudes carried by the set of spring elements; and
locations of spring elements, in the set of spring elements, coupled to the substrate; and
compile the first lateral position, the first longitudinal position, the first force magnitude, the second lateral position, the second longitudinal position, and the second force magnitude into a force image for the scan cycle.

10. The system of claim 9, wherein the controller is configured to interpret the set of force magnitudes, estimate the first force magnitude of the first touch input, and estimate the second force magnitude of the second touch input by:

for each drive and sense electrode pair in the first set of drive and sense electrode pairs:

estimating a force magnitude carried by a spring element, in the set of spring elements, adjacent the drive and sense electrode pair based on a capacitance value, in the first set of capacitance values, read from the first set of drive and sense electrode pairs;

calculating a first distance from the first touch input to the spring element based on the first lateral position and the first longitudinal position of the first touch input;

calculating a second distance from the second touch input to the spring element based on the second lateral position and the second longitudinal position of the second touch input;

estimating a first proportion of the force magnitude, in a first set of force magnitude proportions, applied by the first touch input based on a first ratio of the first distance to a combination of the first distance and the second distance; and estimating a second proportion of the force magnitude, in a second set of force magnitude proportions, applied by the second touch input based on a second ratio of the second distance to the combination of the first distance and the second distance;

estimating the first force magnitude of the first touch input based on a first combination of the first set of force magnitude proportions; and estimating the second force magnitude of the second touch input based on a second combination of the second set of force magnitude proportions.

11. A system for detecting inputs at a computing device comprising:

a substrate comprising:
 a top layer;
 a bottom layer;
 a first set of sense electrodes arranged on the bottom layer of the substrate; and
 a set of support locations arranged on the bottom layer adjacent the first set of sense electrodes;

a touch sensor surface arranged over the top layer of the substrate;

a set of spring elements configured to couple the substrate to a chassis and to yield to displacement of the substrate downward toward the chassis responsive to forces applied to the touch sensor surface, each spring element in the set of spring elements coupled to the substrate at a support location in the set of support locations; and a coupling layer defining a first set of coupling regions and arranged below the substrate, the first set of coupling regions adjacent the first set of support locations and configured to effect electrical values of the first set of sense electrodes responsive to displacement of the substrate toward the coupling layer.

12. The system of claim 11:

wherein the coupling layer comprises a coupling plate; and wherein the set of spring elements and the coupling plate comprise a unitary metallic structure arranged between the substrate and the chassis.

13. The system of claim 12:

wherein the unitary metallic structure comprises a steel coupling plate defining:
 a nominal plane; and
 the set of coupling regions adjacent the set of support locations;

wherein each spring element, in the set of spring elements:
 is formed in the unitary metallic structure;
 extends from a coupling region, in the set of coupling regions;
 defines a stage coupled to a support location, in the set of support locations, on the bottom layer of the substrate; and
 is configured to return to approximately the nominal plane in response to absence of a touch input applied to the touch sensor surface; and wherein each sense electrode, in the set of sense electrodes:
 capacitively couples to an adjacent capacitive coupling region, in the set of coupling regions, of the unitary metallic structure; and
 moves toward the adjacent coupling region in response to application of a force on the touch sensor surface.

14. The system of claim 13:

wherein a first spring element, in the set of spring elements, yields to a touch input applied to a first region of the touch sensor surface proximal the first spring element at a first time;

wherein a first sense electrode, in the set of sense electrodes, adjacent the first region of the touch sensor surface advances toward a first coupling region, in the set of coupling regions on the coupling layer, by a distance proportional to a force magnitude of the touch input; and further comprising a controller configured to:
 detect a first change in capacitance value of the first sense electrode at a first time; and
 interpret the force magnitude of the touch input based on the first change in capacitance value.

15. The system of claim 11:

wherein the coupling layer comprises a coupling plate:
 interposed between the set of spring elements and the substrate;
 comprising an array of perforations aligned with the set of support locations and the set of spring elements; and
 defining the set of coupling regions adjacent the array of perforations;

further comprising a set of spacers, each spacer in the set of spacers:
 extending through a perforation in the array of perforations; and
 coupling a support location, in the set of support locations, on the bottom layer of the substrate to a spring element in the set of spring elements; and wherein each sense electrode, in the set of sense electrodes:
 capacitively couples to an adjacent capacitive coupling region, in the set of coupling regions, of the coupling plate; and
 moves toward the adjacent coupling region in response to application of a force on the touch sensor surface proximal the capacitance sensor.

16. The system of claim 15:
wherein the set of spring elements comprises a unitary structure defining a nominal plane;
wherein each spring element in the set of spring elements comprises a flexure:
formed in the unitary structure;
defining a stage; and
configured to return to approximately the nominal plane in response to absence of a touch input applied to the touch sensor surface; and
wherein each spacer, in the set of spacers, couples a support location, in the set of support locations, on the bottom layer of the substrate, to a stage of a spring element in the set of spring elements.

17. The system of claim 15:
wherein a first spring element, in the set of spring elements, yields to a touch input applied to a first region of the touch sensor surface proximal the first spring element at a first time;
wherein a first sense electrode, in the set of sense electrodes, adjacent the first region of the touch sensor surface, advances toward a first coupling region, in the set of coupling regions on the coupling layer, by a distance proportional to a force magnitude of the touch input; and
further comprising, a controller configured to:
detect a first change in capacitance value of the first sense electrode at a first time; and
interpret the force magnitude of the touch input based on the first change in capacitance value.

18. The system of claim 11:
wherein the substrate defines a rectangular geometry; and
wherein the set of spring elements comprises:
a first subset of spring elements coupled to a first subset of support locations, in the set of support locations, proximal corners of the substrate, the first subset of spring elements characterized by a first spring constant; and
a second subset of spring elements coupled to a second subset of support locations, in the set of support locations, proximal an edge of the substrate, the first subset of spring elements characterized by a second spring constant less than the first spring constant.

19. The system of claim 11:
further comprising:
a first set of drive and sense electrode pairs comprising the first set of sense electrodes and arranged on the bottom layer of the substrate; and
a second set of drive and sense electrode pairs arranged on a top layer of the substrate;
wherein the touch sensor surface is arranged over the second set of drive and sense electrode pairs; and
wherein the controller is configured to, during a scan cycle:
read a first set of capacitance values between drive electrodes and sense electrodes in the first set of drive and sense electrode pairs;
read a second set of capacitance values between drive electrodes and sense electrodes in the second set of drive and sense electrode pairs;
detect a lateral position and a longitudinal position of a touch input on the touch sensor surface based on the second set of capacitance values;
interpret a force magnitude of the touch input based on the first set of capacitance values; and
output the lateral position, the longitudinal position, and the force magnitude.

20. A system for detecting inputs at a computing device comprising:
a substrate comprising:
a top layer;
a bottom layer;
a first set of sense electrodes arranged on the bottom layer of the substrate; and
a set of support locations arranged on the bottom layer adjacent the first set of sense electrodes;
an array of drive and sense electrode pairs arranged on the top layer of the substrate;
a touch sensor surface arranged over the top layer of the substrate;
a set of spring elements configured to couple the substrate to a chassis and to yield to displacement of the substrate downward toward the chassis responsive to forces applied to the touch sensor surface, each spring element in the set of spring elements coupled to the substrate at a support location in the set of support locations;
a coupling layer defining a first set of coupling regions and configured to:
couple to the chassis adjacent the set of spring elements; and
effect capacitance values of the first set of sense electrodes responsive to displacement of the first set of sense electrodes of the substrate toward the first set of coupling regions of the coupling layer; and
a controller configured to:
read a first set of capacitance values between drive electrodes in the array of drive and sense electrode pairs;
read a second set of capacitance values from the first set of sense electrodes;
detect a lateral position and a longitudinal position of a touch input on the touch sensor surface based on the first set of capacitance values;
interpret a force magnitude of the touch input based on the second set of capacitance values; and
output the lateral position, the longitudinal position, and the force magnitude of the touch input.

* * * * *